United States Patent
Don et al.

(10) Patent No.: US 11,093,413 B2
(45) Date of Patent: Aug. 17, 2021

(54) TECHNIQUES FOR USING A STEALTH STORAGE DEVICE FOR SECURE INFORMATION STORAGE

(71) Applicant: EMC IP Holding Company LLC, Hopkinton, MA (US)

(72) Inventors: Arieh Don, Newton, MA (US); George F. Johnson, Holliston, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 57 days.

(21) Appl. No.: 16/595,826

(22) Filed: Oct. 8, 2019

(65) Prior Publication Data

US 2021/0103530 A1 Apr. 8, 2021

(51) Int. Cl.
*G06F 12/14* (2006.01)
*G06F 13/40* (2006.01)
*G06F 21/60* (2013.01)
*G06F 21/62* (2013.01)

(52) U.S. Cl.
CPC ...... *G06F 12/1475* (2013.01); *G06F 13/4022* (2013.01); *G06F 21/602* (2013.01); *G06F 21/6218* (2013.01); *G06F 2212/1052* (2013.01)

(58) Field of Classification Search
None
See application file for complete search history.

(56) References Cited

U.S. PATENT DOCUMENTS

| | | | |
|---|---|---|---|
| 9,063,661 B1* | 6/2015 | Raizen | G06F 3/0611 |
| 2005/0013441 A1* | 1/2005 | Klein | H04L 63/06 |
| | | | 380/278 |
| 2007/0033566 A1* | 2/2007 | Weber | H04L 67/1097 |
| | | | 716/51 |
| 2007/0157029 A1* | 7/2007 | Mani | G06F 12/1466 |
| | | | 713/183 |
| 2015/0317254 A1* | 11/2015 | Candelaria | G06F 21/6272 |
| | | | 711/163 |
| 2016/0253186 A1* | 9/2016 | Brown | H04L 63/10 |
| | | | 710/104 |

* cited by examiner

*Primary Examiner* — Jane Wei
(74) *Attorney, Agent, or Firm* — Muirhead and Saturnelli, LLC

(57) ABSTRACT

Techniques for protecting information may include: exposing a logical device of a data storage system to a host, wherein the logical device has an attribute identifying the logical device as a stealth device having accessibility controlled by the data storage system based on commands issued over a control path, wherein the logical device has a mode indicating whether the logical device is accessible to the host; sending, from the host to the data storage system, a write command that writes first data on the logical device when the mode indicates the logical device is accessible to the host; and subsequent to said sending, issuing a command over the control path to the data storage system, wherein the command sets the mode of the logical device to inaccessible indicating the logical device is not accessible to the host.

20 Claims, 14 Drawing Sheets

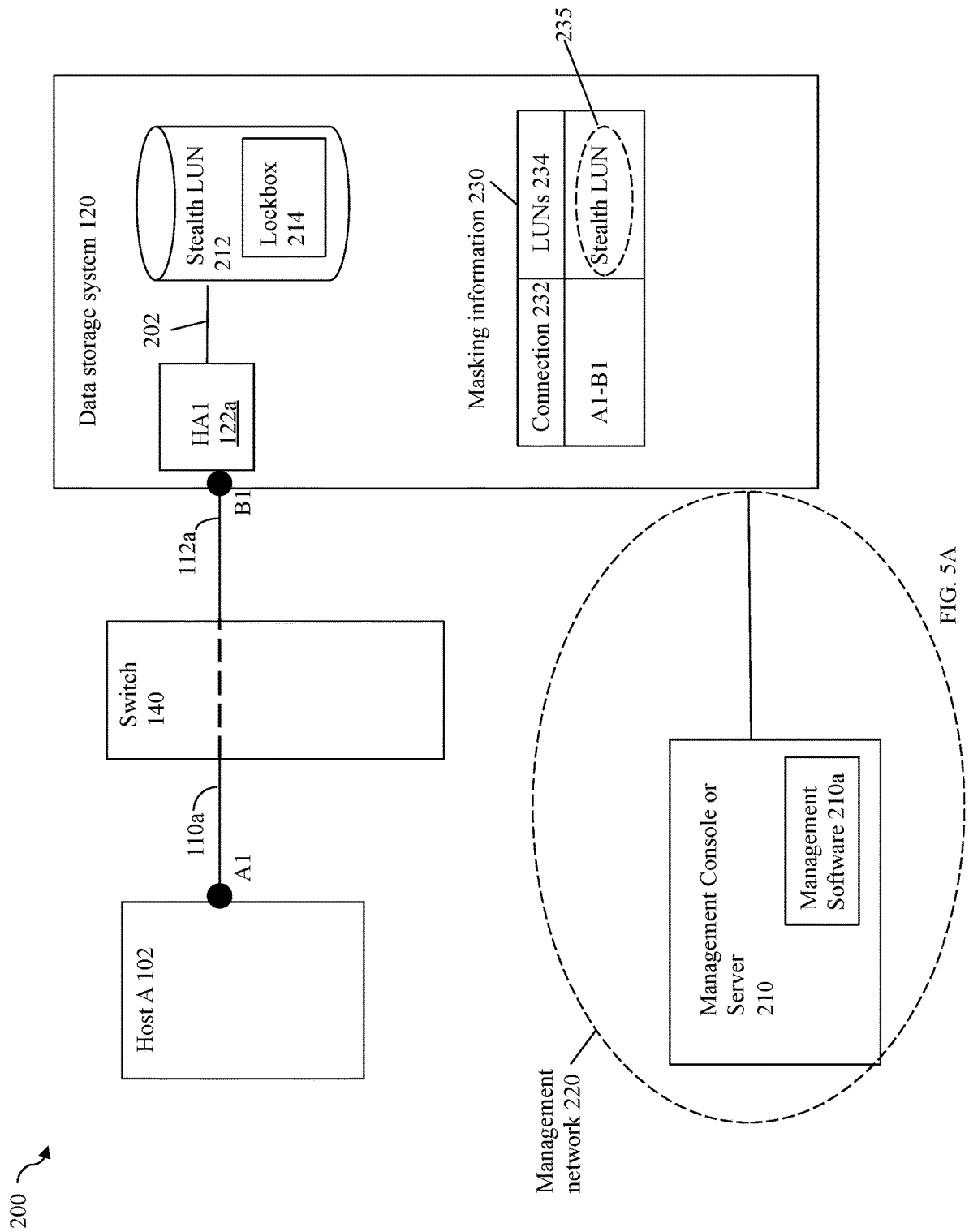

TECHNIQUES FOR USING A STEALTH STORAGE DEVICE FOR SECURE INFORMATION STORAGE

BACKGROUND

Technical Field

This application generally relates to data storage and, more particularly, techniques for secure storage of information.

Description of Related Art

Data storage systems may include resources used by one or more host systems. Data storage systems and host systems may be interconnected by one or more communication connections such as in a network. These resources may include, for example, data storage devices such as those included in the data storage systems. These data storage systems may be coupled to one or more host systems where the data storage systems provide storage services to each host system. Multiple data storage systems from one or more different vendors may be connected and may provide data storage services for one or more host systems.

A host may perform a variety of data processing tasks and operations. For example, a host may perform I/O operations such as data read and write operations sent to the data storage system.

Host systems may store data to and/or retrieve data from a storage device included in a data storage system containing a plurality of host interface units, physical storage devices or drives, and physical storage interface units. The storage device may be a logical storage device. The host systems access the storage device through a plurality of channels provided therewith. Host systems may perform read and write operations through the channels to the data storage system and the data storage system provides data to the host systems also through the channels. The host systems do not address the physical storage devices or drives of the data storage system directly, but rather, access what appears to the host systems as a plurality of logical storage devices or units (which may or may not correspond to the actual physical storage devices or drives). Allowing multiple host systems to access a single storage device allows the host systems to share data of the storage device. In order to facilitate sharing of the data on the storage device, additional software on the data storage systems may also be used.

An application may execute on a host where the application performs I/O (input/output) operations. The host may be able to transmit the data operation to the data storage system over any one or more different paths or multiple paths. Multipathing functionality, such as for path selection and management of the multiple paths, may be handled by a device driver of the host. When an application on the host issues an I/O operation, it may be received by a device driver of the host which facilitates sending and/or receiving transmissions between the application and the data storage system.

SUMMARY OF THE INVENTION

Embodiments of the techniques herein include a method, computer readable medium and system for protecting information comprising: exposing a logical device of a data storage system to a host, wherein the logical device has an attribute identifying the logical device as a stealth device having accessibility controlled by the data storage system based on commands issued over a control path, wherein the logical device has a mode indicating whether the logical device is accessible to the host; sending, from the host to the data storage system, a write command that writes first data on the logical device when the mode indicates the logical device is accessible to the host; and subsequent to said sending, issuing a command over the control path to the data storage system, wherein the command sets the mode of the logical device to inaccessible indicating the logical device is not accessible to the host. The first data may include a password used in connection with performing an operation on the data storage system. The first data may include a key used in connection with at least one of encryption and decryption of data stored on the data storage system. Responsive to the data storage system receiving the command, first processing may be performed by the data storage system to execute the command using one or more control mechanisms that makes the logical device inaccessible to the host.

In at least one embodiment, the one or more control mechanisms may include masking information and the first processing may include modifying masking information to denote that the logical device is inaccessible to the host. The logical device may be exposed to the host over a target port of the data storage system. Prior to the first processing, the masking information may indicate that the logical device is accessible over a first path between an initiator port of the host and the target port of the data storage system and wherein, prior to the first processing, the logical device may be exposed to the initiator port of the host through the target port of the data storage system. After performing the first processing, the masking information may indicate that the logical device is not accessible over the first path between the initiator port of the host and the target port of the data storage system and wherein, after the first processing, the logical device may not be exposed to the initiator port of the host through the target port of the data storage system.

In at least one embodiment, the one or more control mechanisms may include zoning information, wherein a switching fabric connects the host to the data storage system. The first processing may include modifying the zoning information used by the switching fabric to disallow access of the logical device to the host. Prior to the data storage system performing first processing to execute the command, the zoning information may indicate that the logical device is accessible, through the switching fabric, to a first initiator port of the host from a first target port of the data storage system. The first processing may include modifying the zoning information to indicate that the logical device is not accessible, through the switching fabric, to the first initiator port of the host from the first target port of the data storage system; and reconfiguring the switching fabric using the zoning information that has been modified by said modifying to disallow access of the logical device to the first initiator port of the host from the first target port of the data storage system.

In at least one embodiment, the one or more control mechanisms include reservation information for the logical device. The first processing may include creating a reservation by the data storage system for the logical device, wherein the reservation may provide exclusive access to the logical device by the data storage system, and wherein the reservation may be marked as non-preemptive by another reservation request from an external client of the data storage system. The reservation information for the logical device may be updated to denote the reservation by the data storage system. Prior to the first processing and also subsequent to the first processing, the logical device may be exposed to an initiator port of the host through a target port of the data storage system. Subsequent to the first processing, an I/O command may be sent from the host to the data storage system, wherein the I/O command is directed to the logical device. Processing may include determining, by the data storage system using said reservation information for the logical device, that the host is not allowed to access the logical device; and responsive to determining, using the reservation information for the logical device, that the host is not allowed to access the logical device, not servicing the I/O command from the host.

In at least one embodiment, the first data stored on the logical device may be protected using a password whereby the first data is only accessible upon providing the password. In at least one embodiment, the first data stored on the logical device may be encrypted.

In at least one embodiment, the mode of the logical device may change over time between a setting of accessible to the host and a setting of inaccessible to the host in accordance with a defined schedule. The attribute, identifying the logical device as a stealth device having accessibility controlled by the data storage system based on commands issued over the control path, may be specified when configuring the logical device.

BRIEF DESCRIPTION OF THE DRAWINGS

Features and advantages of the present invention will become more apparent from the following detailed description of exemplary embodiments thereof taken in conjunction with the accompanying drawings in which:

FIGS. 5A, 5B, 5C, 6A, 6B, 7A, 7B and 8 are examples illustrating various embodiments in accordance with the techniques herein.

DETAILED DESCRIPTION OF EMBODIMENT(S)

Figure 1:
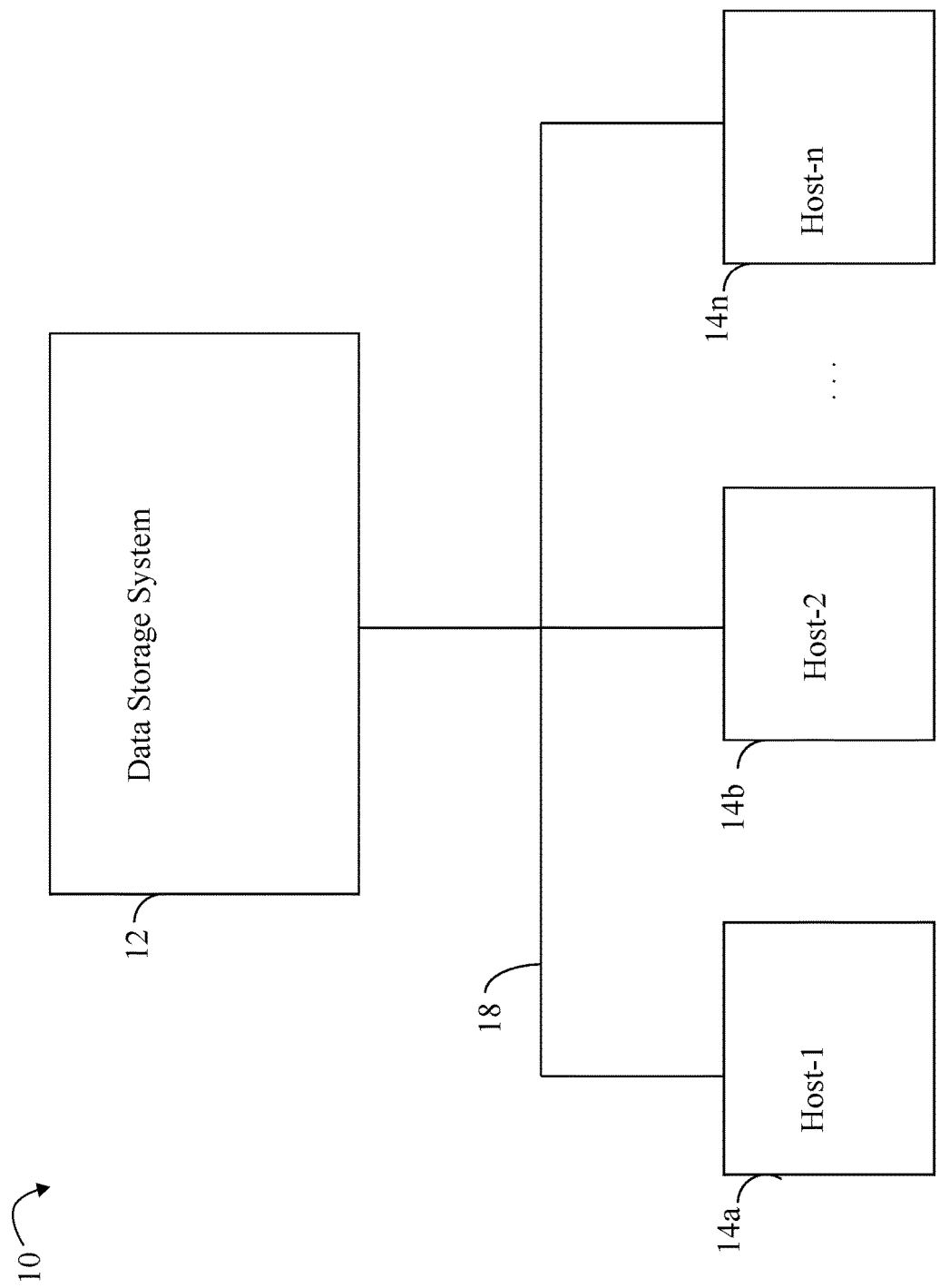
FIG. 1 is an example of an embodiment of a system that may utilize the techniques described herein.

Referring to FIG. 1, shown is an example of an embodiment of a system that may be used in performing the techniques described herein. The system 10 includes a data storage system 12, such as a data storage array, connected to host systems 14a-14n through communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be an intranet, network or other wireless or other hardwired connection(s) by which the host systems 14a-14n may access and communicate with the data storage system 12, and may also communicate with others included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as TCP/IP, SCSI (Small Computer Systems Interface), Fibre Channel, iSCSI, Fibre Channel over Ethernet, NVMe (Non-Volatile Memory Express) over Fabrics, and the like. Some or all of the connections by which the hosts and data storage system 12 may be connected to the communication medium 18 may pass through other communication devices, switching equipment that may exist such as a phone line, a repeater, a multiplexer or even a satellite.

Each of the host computer systems may perform different types of data operations in accordance with different types of administrative tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12. It should be noted that the data storage system 12 of FIG. 1 may physically be a single data storage system, as well one or more other data storage systems as may vary with the embodiment.

Figure 2A:
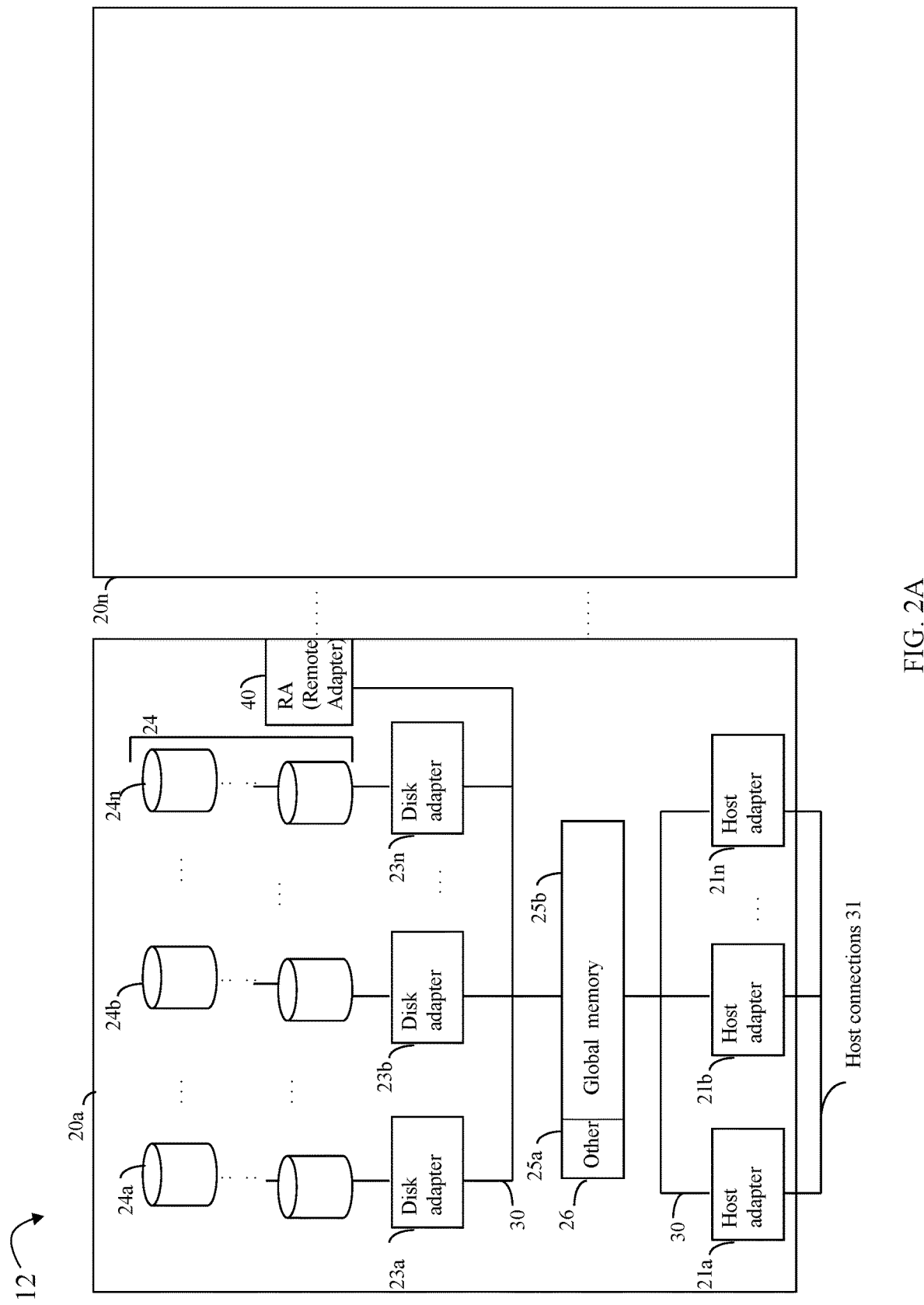
FIG. 2A is an example of an embodiment of a data storage system.

Referring to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be interconnected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20*a*. It should be noted that a similar more detailed description may also apply to any one or more of the other elements, such as 20*n*, but have been omitted for simplicity of explanation. It should also be noted that an embodiment may include data storage systems from one or more vendors. Each of 20*a*-20*n* may be resources included in an embodiment of the system 10 of FIG. 1 to provide storage services to, for example, host computer systems. It should be noted that the data storage system 12 may operate stand-alone, or may also be included as part of a storage area network (SAN) that includes, for example, other components.

Each of the data storage systems, such as 20*a*, may include a plurality of disk devices or volumes, such as the arrangement 24 consisting of n rows of disks or more generally, data storage devices, 24*a*-24*n*. In this arrangement, each row of disks may be connected to a disk adapter ("DA") or director responsible for the backend management of operations to and from a portion of the disks 24. In the system 20*a*, a single DA, such as 23*a*, may be responsible for the management of a row of disks, such as row 24*a*. In a data storage, a backend DA may also be referred to as a disk controller. The DA may perform operations such as reading data from, and writing data to, the physical devices which are serviced by the DA.

It should be noted that, more generally, the physical devices or data storage devices 24*a*-24*n* may be any suitable type of physical storage device or media, such as any form of suitable back-end non-volatile storage device. For example, physical devices included in an embodiment of a data storage system may include one or more types of rotating disk drives (e.g., SATA, SAS, FC 15 K RPM, FC 10 K RPM), one or more types of flash-based storage devices (e.g., SLC (single level cell) flash, MLC (multi-level cell) flash, TLC, (tri-level cell) flash) or more generally solid state drives (SSDs), and the like.

Also shown in the storage system 20*a* is an RA or remote adapter 40. The RA may be hardware including a processor used to facilitate communication between data storage systems, such as between two of the same or different types of data storage systems.

The system 20*a* may also include one or more host adapters ("HAs") or directors 21*a*-21*n*. Each of these HAs may be used to manage communications and data operations between one or more host systems and the global memory. In an embodiment, the HA may be a Fibre Channel Adapter (FA) or other adapter which facilitates host communication. Generally, directors may also be characterized as the different adapters, such as HAs (including FAs), DAs RAs and the like, as described herein. Components of the data storage system, such as an HA, which may communicate with a host (e.g., receive host I/O commands and send responses to the host) may also be referred to as front end components. A component of the data storage system which communicates with a front end component may be characterized as a backend component, such as a DA. In connection with data storage systems, various types of directors or adapters may be implemented as a processor, or, more generally, a component that includes the processor. Examples of directors are DAs, HAs, RAs, and the like, such as described herein.

One or more internal logical communication paths may exist between the DAs, the RAs, the HAs, and the memory 26. An embodiment, for example, may use one or more internal busses and/or communication modules. For example, the global memory portion 25*b* may be used to facilitate data transfers and other communications between the DAs, HAs and RAs in a data storage system. In one embodiment, the DAs 23*a*-23*n* may perform data operations using a cache that may be included in the global memory 25*b*, for example, in communications with other disk adapters or directors, and other components of the system 20*a*. The other portion 25*a* is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical units. A logical unit (LUN) may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives. For example, one or more LUNs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LUN(s) residing thereon.

The DA physically accesses the back-end non-volatile storage devices, such as physical data storage devices (PDs) denoted by 24 of FIG. 2A. Data residing on a PD may be accessed by the DA following a data request in connection with I/O operations that other directors originate. In at least one embodiment, write data received at the data storage system from a host or other client may be initially written to cache memory (e.g., such as may be included in the component designated as 25*b*) and marked as write pending. Once written to cache, the host may be notified that the write operation has completed. At a later point time, the write data may be destaged from cache to the physical storage device, such as the non-volatile physical storage device (PDs of 24) accessed by a DA. In connection with reads, processing may include first looking to see if the requested read data is in cache whereby a read hit occurs. For a read hit, the read is serviced using the cached copy of the requested read data by returned the cached read data to the requester. Thus, with a read hit, there is no need to access the physical (back end) non-volatile storage by the DA to obtain the requested read data thereby resulting in a faster read I/O response time. If the requested read data is not in cache, the requested read data is obtained from the physical (back end) non-volatile storage by the DA where the read data is then stored in the cache, and returned to the requester. The cached copy of the read data may then be available to further service any other subsequent reads. As known in the art, any suitable cache management techniques may be used to maintain the cache, for example, such as is determining how long data remains in cache, whether to prefetch data, selecting data stored in the cache for eviction, and the like.

Figure 2B:
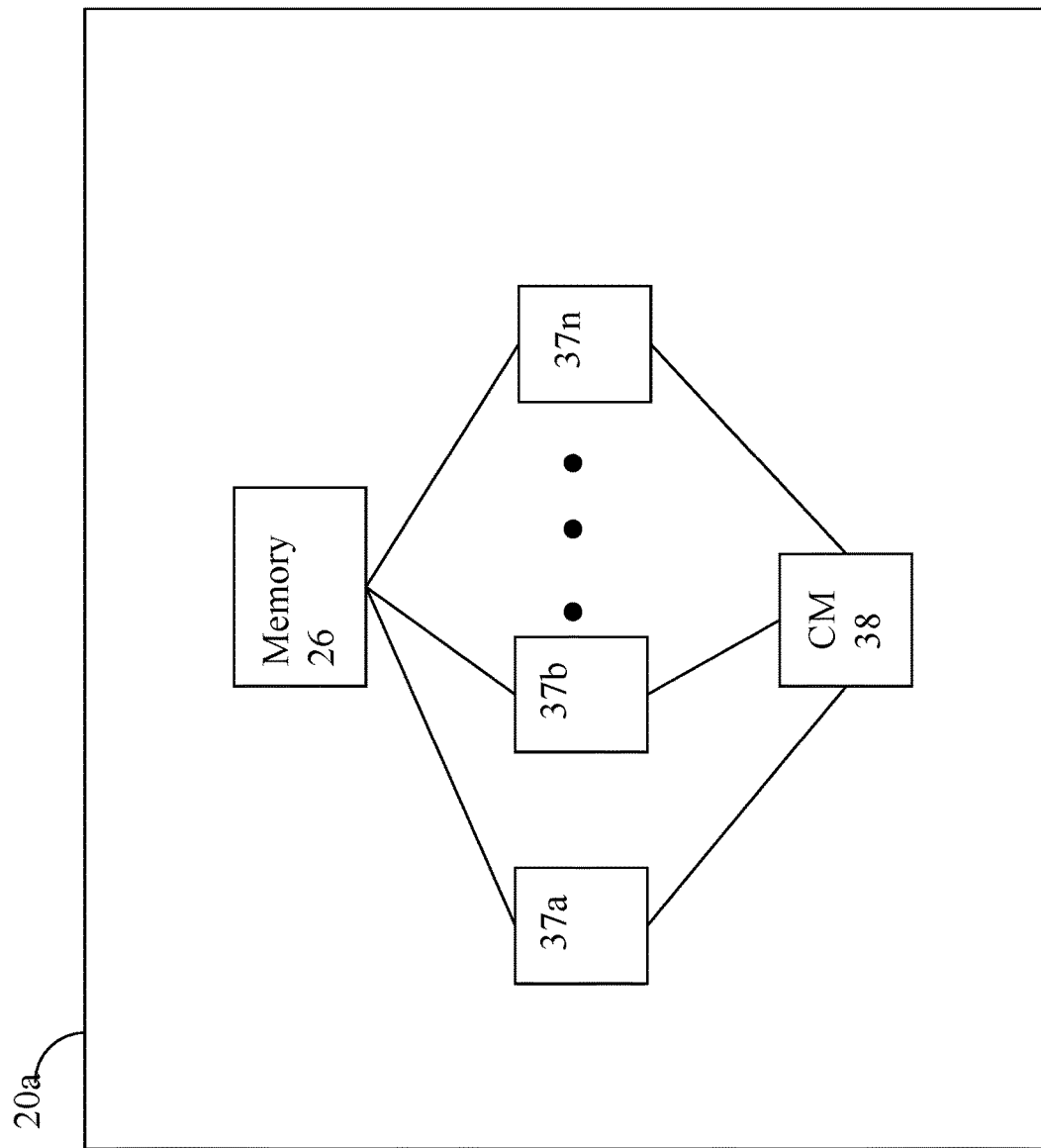
FIG. 2B is a representation of the logical internal communications between the directors and memory included in one embodiment of data storage system of FIG. 2A.

Referring to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HAs, RAs, or DAs that may be included in a data storage system. Each of the directors may be, for example, a processor or a printed circuit board that includes a processor and other hardware components. The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

A host may be able to access data, such as stored on a LUN of a data storage system, using one or more different paths from the host to the data storage system. A data storage system device, such as a LUN, may be accessible over multiple paths between the host and data storage system as described in more detail below. Thus, a host may select one of possibly multiple paths over which to access data of a storage device.

It should be noted that the particular exemplary architecture of a data storage system such as, for example, in FIGS. 2A and 2B is merely illustrative of one such architecture that may be used in connection with techniques herein. Those skilled in the art will appreciate that techniques herein may be used with any suitable data storage system. For example, FIG. 2B provides an example of components that may be included in a separate physical fabric used for control communications sent between components of the data storage system. Some embodiments may use separate physical fabrics for each of data movement and control communications between data storage system components. Alternatively, some embodiments may use a same shared physical fabric for both data movement and control communication functionality rather than have a separate control communications fabric such as illustrated in FIG. 2B.

In an embodiment of a data storage system in accordance with techniques herein, components such as HAs, DAs, and the like may be implemented using one or more "cores" or processors each having their own memory used for communication between the different front end and back end components rather than utilize a global memory accessible to all storage processors.

It should be noted that although examples of techniques herein may be made with respect to a physical data storage system and its physical components (e.g., physical hardware for each HA, DA, HA port and the like), techniques herein may be performed in a physical data storage system including one or more emulated or virtualized components (e.g., emulated or virtualized ports, emulated or virtualized DAs or HAs), and also a virtualized or emulated data storage system including virtualized or emulated components.

The data storage system may provide various data services. For example, in at least one embodiment in accordance with the techniques herein, a data storage system may provide data encryption and decryption services for, respectively, encrypting and decrypting data. For example, data stored on PDs of the data storage system may be stored in an encrypted form. Encrypted data may be read from the PDs and decrypted as needed, such as in connection with servicing read miss operations. Data transmitted, for example, between data storage systems such as in connection with remote replication or backup services may be transmitted in an encrypted form that is then decrypted by the receiver.

Any suitable encryption and decryption technique may be utilized. For example, symmetric encryption and/or asymmetrical encryption, also known as public key cryptography, may be utilized. With symmetric encryption, one secret key is used to both encrypt and decrypt information. The sender and the recipient both know the secret key that is used to encrypt and decrypt all the messages. Widely used symmetric algorithms may include, for example, (Advanced Encryption Standard) AES-128, AES-192, and AES-256. For example, symmetric encryption may be used in connection with user data stored on a PD of the data storage system.

Asymmetrical encryption uses a public key and a private key. The public key is made freely available. The second private key is kept a secret. A message that is encrypted using a public key can only be decrypted using the private key, while also, a message encrypted using the private key can be decrypted using the public key. Security of the public key is not required because it is publicly available and can be passed over the internet. For example, asymmetrical encryption and decryption may be used in connection with data transmitted between data storage systems, a host and a data storage system, and the like.

A data storage system may provide support for one or more types of logical devices or LUNs. The techniques herein may be used in an embodiment having thin or virtually provisioned logical devices. A thin logical device or LUN is a type of logical device where units of storage are progressively allocated on an as-needed basis. Typically, the base units of storage are provisioned from multiple sets of PDs organized as RAID groups, where these groups are partitioned into small portions sometimes referred to as slices. There is a mapping provided to relate the logical address in a thin device to the particular slice of provisioned storage. In a system using thin provisioning, the thin devices may appear to a host coupled to a data storage array as one or more logical volumes (logical devices) containing contiguous blocks of data storage. A thin device may be virtually provisioned in terms of its allocated physical storage where physical storage for a thin device (presented to a host as having a particular capacity) is allocated as needed rather than allocate physical storage for the entire thin device capacity upon creation of the thin device. As such, a thin device presented to the host as having a capacity with a corresponding LBA (logical block address) range may have portions of the LBA range for which storage is not allocated. In some embodiments, storage associated with a particular subrange of the logical address space of a thin device (where the subrange may be the size of a slice or chunk allocation unit) may be initially allocated in response to the first time there is write to the logical address subrange. Thin devices and thin provisioning are described in more detail in U.S. patent application Ser. No. 11/726,831, filed Mar. 23, 2007 (U.S. Patent App. Pub. No. 2009/0070541 A1), AUTOMATED INFORMATION LIFE-CYCLE MANAGEMENT WITH THIN PROVISIONING, Yochai, EMS-147US, and U.S. Pat. No. 7,949,637, Issued May 24, 2011, Storage Management for Fine Grained Tiered Storage with Thin Provisioning, to Burke, both of which are incorporated by reference herein.

An embodiment in accordance with techniques herein may provide for logical devices that are thin or virtually provisioned devices along with thick logical devices. A thick device or LUN may be characterized as a regular logical device presented as having a particular storage capacity where physical storage is provisioned (allocated or bound) for the entire storage capacity when the thick device is configured.

Figure 3:
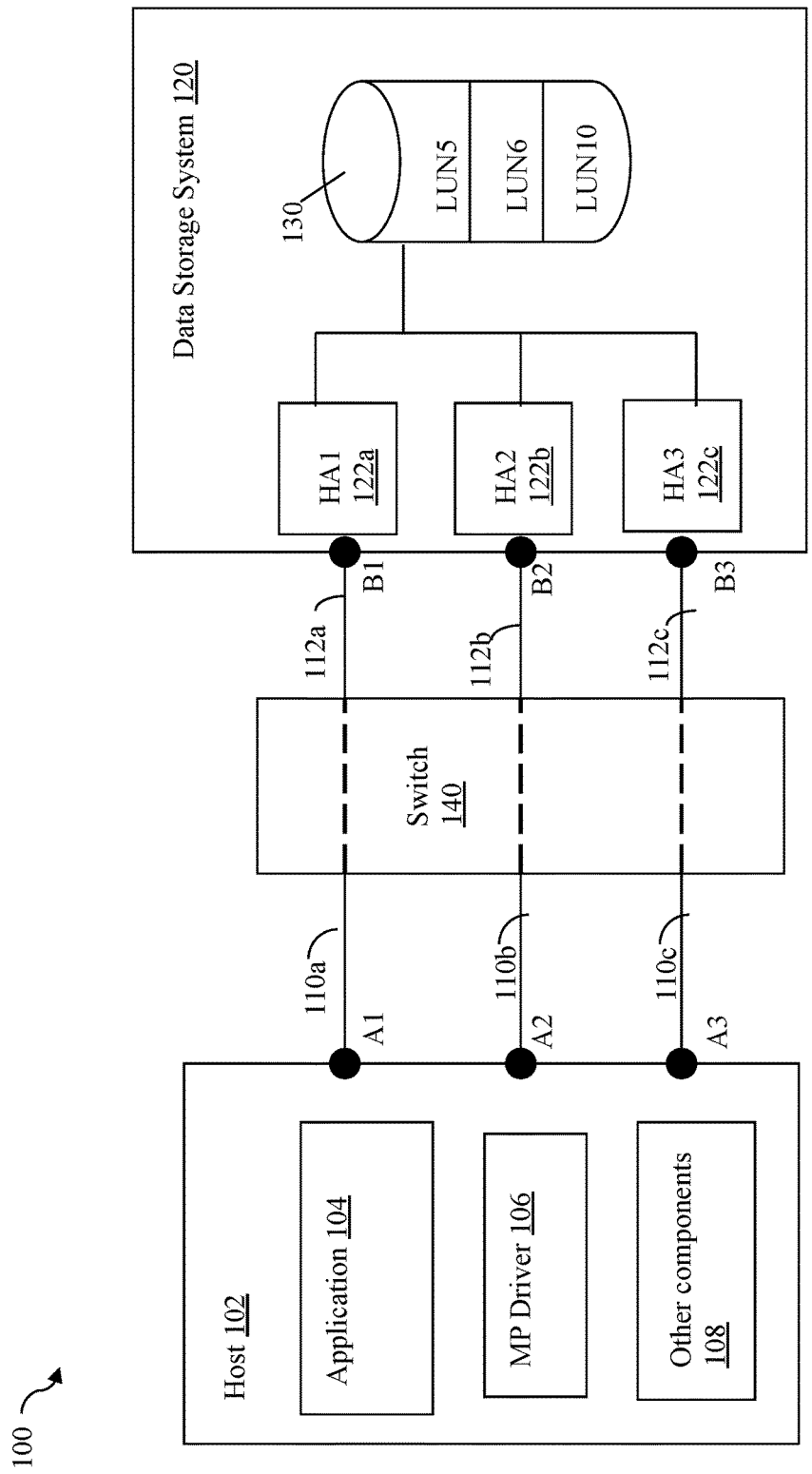
FIG. 3 is an example of systems and components that may be used in connection with the techniques herein.

Referring to FIG. 3, shown is an example of an embodiment of a system that may be utilized in connection with the techniques herein. The example 100 includes a host 102, switch 140 and data storage system 120. The host 102 and data storage system 120 may communicate over one or more paths through the switch 140. Elements 110a-110c denote connections between the host 102 and switch 140. Element 112a-112c denote connections between the data storage system 120 and the switch 140. Element 130 may represent a physical device of the data storage system 120 where the physical device 130 may be configured to include 3 LUNs—LUN5, LUN6 and LUN10. It should be noted that the example 100 includes only a single host, single physical device 130 with 3 LUNs, a single data storage system, and a fabric including a single switch for purposes of simplicity to illustrate the techniques herein.

The host 102 may include an application 104, a multi-path (MP) driver 106 and other components 108 whereby element 108 may also include one or more other device drivers and other code. An I/O operation from the application 104 may be communicated to the data storage system 120 using the MP driver 106 and one or more other components represented by element 108. The application 104 may be a database or other application which issues data operations, such as I/O operations, to the data storage system 120.

Each of the I/O operations may be directed to a device, such as one of the LUNs of device 130, configured to be accessible to the host 102 over multiple physical paths. As such, each of the I/O operations may be forwarded from the application 104 to the data storage system 120 over one of the possible multiple paths. The MP driver 106 may include functionality to perform any one or more different types of processing such as related to encryption, multipathing, mirroring, migration, and the like. For example, the MP driver 106 may include multipathing functionality for management and use of multiple paths. For example, the MP driver 106 may perform path selection to select one of the possible multiple paths based on one or more criteria such as load balancing to distribute I/O requests for a LUN device across available active paths. Load balancing may be performed to provide for better resource utilization and increased performance of the host, data storage system, and network or other connection infrastructure. The MP driver 106 may be included in a commercially available product such as, for example, Dell® EMC PowerPath® software by Dell Inc. The host 102 may also include other components 108 such as one or more other layers of software used in connection with communicating the I/O operation from the host to the data storage system 120. For example, element 108 may include Fibre Channel or SCSI drivers, a logical volume manager (LVM), and the like. It should be noted that element 108 may include software or other components used when sending an I/O operation from the application 104 where such components include those invoked in the call stack above the MP driver 106 and also below the MP driver 106. For example, application 104 may issue an I/O operation which is communicated in a call stack including an LVM, the MP driver 106, and an FC or SCSI driver. This is described in more detail below such as with a subsequent figure.

The data storage system 120 may include one or more physical data storage devices, such as device 130, where each such physical device may be configured to store data of one or more LUNs as described above. Each of the LUNs having data stored on the device 130 may be configured to be accessible to the host through multiple paths. For example, all LUNs of 130 may be accessible using ports of the three front end directors or interfaces 122a-122c, also denoted respectively HA1, HA2 and HA3. The multiple paths allow the application I/Os to be routed over multiple paths and, more generally, allow the LUNs of device 130 to be accessed over multiple paths. In the event that there is a component failure in one of the multiple paths, application I/Os can be easily routed over other alternate paths unaffected by the component failure. Thus, an embodiment of the MP driver 106 may also perform other processing in addition to load balancing in connection with path selection. The MP driver 106 may be aware of, and may monitor, all paths between the host and the LUNs of the device 130 in order to determine that particular state of such paths with respect to the various LUNs. In this manner, the MP driver may determine which of the multiple paths over which a LUN is visible may be used for issuing I/O operations successfully, and to use such information to select a path for host-data storage system communications issued to a particular LUN.

In the example 100, each of the LUNs of the device 130 may be configured as accessible through three paths. Each path may be represented by two path endpoints—a first endpoint on the host 102 and a second endpoint on the data storage system 120. The first endpoint may correspond to a port of a host component, such as a host bus adapter (HBA) of the host 102, and the second endpoint may correspond to a port of a data storage system component, such as a port of an HA of the data storage system 120. In the example 100, elements A1, A2 and A3 each denote a port of a host 102 (e.g. such as a port of an HBA), and elements B1, B2 and B3 each denote a target port of an HA of the data storage system 120. Each of the LUNs of the device 130 may be accessible over three paths—a first path represented by A1-B1, a second path represented by A2-B2 and a third path represented by A3-B3.

Figure 4:
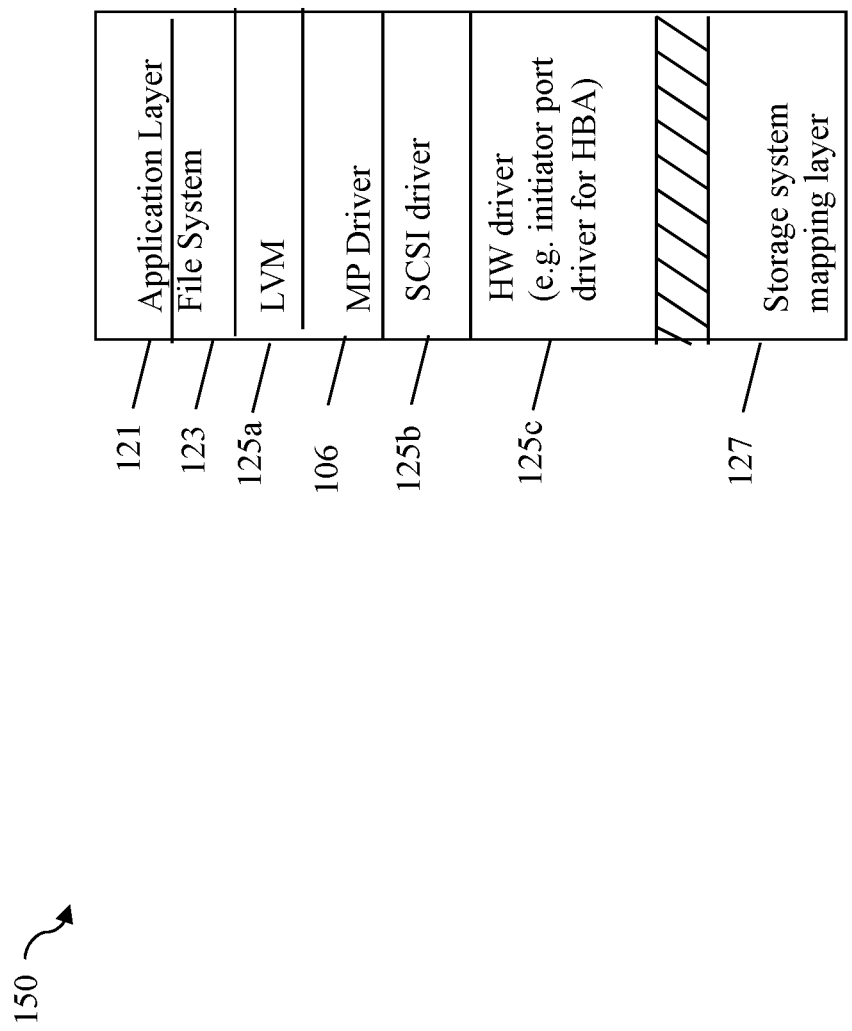
FIG. 4 is an example of different software layers that may be included in a host and data storage system in an embodiment in accordance with the techniques herein.

Referring to FIG. 4, shown is a representation of a number of mapping layers that may be included in a computer system, such as host 102 of FIG. 3, in combination with a data storage system. FIG. 4 provides further detail regarding various software layers that may be used in connection with the MP driver 106 of FIG. 3.

In an embodiment in accordance with techniques herein, the data storage system as generally described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

The various software layers of 150 may generally form layers included in the runtime I/O stack, such as when an I/O request is issued by an application on a host to a data storage system. The system includes an application layer 121 which includes application programs executing on the host computer 102. The application layer 121 may refer to storage locations using an associated label or identifier such as a file name or file identifier. Below the application layer 121 is the file system layer 123 and the LVM layer 125a that maps the label or identifier specified by the application layer 121 to a LUN which the host may perceive as corresponding to a physical device address (e.g., the address of one of the disk drives) within the storage system 12. Below the LVM layer 125a may be the MP (multipath) driver 106 which handles processing of the I/O received from layer 125a. The MP driver 106 may include a base driver and one or more driver extension modules. The MP driver 106 may be included in a commercially available product such as Dell® EMC PowerPath® software. Functionality for performing multipathing operations by multipathing software, such as the MP driver 106, may be included in one of the driver extension modules such as a multipath extension module. As described above, the MP driver may perform processing in connection with multiple path management and selecting one of a plurality of possible paths for use in connection with processing I/O operations and communicating with the data storage system, such as 120 of FIG. 3. More generally, one or more layers between the application layer 121 and the MP driver 106 may provide for mapping a LUN (such as used in connection with block-based storage) presented by the data storage system to the host to another logical data storage entity, such as a file, that may be used by the application layer 123. Below the MP driver 106 may be the SCSI driver 125b and a hardware (HW) driver 125c. The SCSI driver 125b may handle processing of a received I/O request from the MP driver 106 such as related to forming a request in accordance with the SCSI standard. The driver 125c may be a HW driver that facilitates communication with hardware on the host. The driver 125c may be, for example, a driver for an HBA of the host which sends commands or requests to the data storage system and also receives responses and other communications from the data storage system.

In some embodiments, the data storage system 120 may be an intelligent data storage system having its own mapping layer 127 such that the LUN known or exposed to the host may not directly correspond to a physical device such as a disk drive. In such embodiments, the LUN provided by the host in connection with the I/O operation may be further mapped by the data storage system using its mapping layer 127. For example, a LUN provided by the host may be mapped by the data storage system to one or more physical drives, multiple LUNs may be located on a same physical device, multiple physical drives, and the like. In other embodiments, the data storage system may not include such a mapping layer 127.

The MP driver 106, as well as other components illustrated in FIG. 4, may execute in kernel mode or other privileged execution mode. In one embodiment using a Unix-based operating system, the MP driver 106 may execute in kernel mode. In contrast, an application such as represented by application layer 121 may typically execute in user mode, or more generally, a non-privileged execution mode. Furthermore, it will be appreciated by those skilled in the art that the techniques herein may be used in an embodiment having any one of a variety of different suitable operating systems including a Unix-based operating system as mentioned above, any one of the Microsoft Windows® operating systems, a virtualized environment, such as using the VMware™ ESX hypervisor by VMware, Inc, and the like.

In operation, an application executing at application layer 121 may issue one or more I/O operations (e.g., read and write commands or operations) to logical volumes (implemented by the LVM 125a) or files (implemented using the file system 123) whereby such I/O operation may be then mapped to data operations directed to LUNs of the data storage system. Such I/O operations from the application layer 121 may be directed to the MP driver 106 after passing through any intervening layers such as layers 123 and 125a. It should be noted that, in some embodiments, the MP driver 106 may also be below the SCSI driver 125b.

In connection with the SCSI standard, a path may be defined between two ports as described above. A command may be sent from the host (as well as a component thereof such as a host bus adapter) and may be characterized as an initiator, originator or source with respect to the foregoing path. The host, as the initiator, sends requests to a data storage system (as well as a particular component thereof such as another HA having a port with a network address) characterized as a target, destination, receiver, or responder. Each physical connection of a path may be between a first endpoint which is a port of the host (e.g., such as of a host bus adapter having ports such as denoted as A1-A3 of FIG. 3) and a second endpoint which is a port of an HA (e.g., such as B1-B3 of FIG. 3) in the data storage system. Over each such path, one or more LUNs may be visible or exposed to the host initiator through the target port of the data storage system.

An I/O command or operation, such as a read or write operation, from the host to the data storage system may be directed to a LUN and a logical address or location in the LUN's logical address space. The logical address or location of the LUN may be characterized as the target logical address of the I/O operation. The target logical address or location of the I/O operation may identify an LBA within the defined logical address space of the LUN. The I/O command may include various information such as identify the particular type of I/O command as read or write, identify the target logical address (e.g., LUN and LUN logical address) of the I/O command, and other information. In connection with servicing the I/O operation, the data storage system may map the target logical address to a physical storage location on a PD of the data storage system. The physical storage location may denote the physical storage allocated or provisioned and also mapped to the target logical address.

The data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receiving a response (possibly including requested data) in connection such I/O commands.

The data path or I/O path may be contrasted with a control path. The data or I/O path and control path define two sets of different logical flow paths. The control path, also sometimes referred to as the management path, may be characterized as the path or flow of data management or control commands through a system. For example, the control or management path may be the logical flow through hardware and software components or layers in connection with issuing data storage management command to and/or from a data storage system, and also receiving responses (possibly including requested data) to such control or management commands. For example, with reference to the FIG. 1, the control commands may be issued from data storage management software executing on a management system, such as another computer system or other device with a processor that is connected to the data storage system 12. Such commands may be, for example, to establish or modify data services; view performance or health of various system components and storage entities; provision storage; perform user account management; and the like. For example, commands may be issued over the control path to provision storage for LUNs; define a storage group (SG) which is a logically defined group of one or more LUNs; create a snapshot; define conditions of when to create another snapshot; define or establish local and/or remote replication services; define or modify a schedule for snapshot or other data replication services; define a RAID group; obtain data storage management and configuration information for display in a graphical user interface (GUI) of a data storage management program or application; generally modify one or more aspects of a data storage system configuration; view properties, performance, and/or status information regarding LUNs or other storage objects (e.g., physical and/or logical entities in the data storage system); and the like.

Sensitive information, such as sensitive critical metadata, may be used in connection with operations performed on the data storage system. Such metadata may include, for example, passwords, encryption keys, decryption keys, and the like, that may be used, for example, to access system and/or user data stored on the data storage system, to transmit messages and data to and from the data storage system, perform various operations, and the like. The critical information or metadata may be stored on the data storage system in a protected logical storage container also sometimes referred to as a lockbox. The metadata such as passwords and/or keys stored in the lockbox may be protected using one or more logical protection or security layers. In other words, the lockbox itself may be protected using various levels of security or protection. For example in order to access the lockbox and metadata stored therein, a user may be required to login to the system with validated user credentials (e.g., user name and password). Additionally, in order for the user to access the information in the lockbox, the user may be required to log into the system using an account having a particular assigned user role allowing access to the lockbox. For example, the user account may be required to be assigned an administrator role providing the proper access to the lockbox.

Restrictive directory or file permissions are another way to limit or restrict access to the information in the lockbox. For example, the lockbox maybe implemented using a file containing the sensitive metadata where access to the file is limited to only particular user accounts, user assigned roles, and the like.

As another means of security or protection of the lockbox, the information in the lockbox itself may be encrypted and a user may be required to provide or have access to the particular key used to decrypt, and thus open and access, the metadata information in the lockbox.

As another means of security or protection of the lockbox, the information in the lockbox itself may be further password protected and a user may be required to provide or have access to the particular password to open the lockbox and access the stored metadata information.

As yet another means of security or protection of the lockbox, a user may be allowed to access the information in the lockbox based on stable system values. For example, a user may login remotely to the data storage system using another computer, such as from a host or other computer system. The stable system values (SSVs) may include, for example, the IP address, operating system version, and possibly other attributes associated with the user's computer system and/or network connection to the data storage system over which the user is logged in when trying to access the lockbox. Access to information stored in the lockbox may be limited to only particular computer systems and connections based on such SSVs.

Generally, the methods described above may use information that is discoverable and/or may be spoofed by an unauthorized user. As such the methods described above may be used by the unauthorized user to access the lockbox and the sensitive metadata stored in the lockbox.

As yet another method, the lockbox may be stored on a LUN of the data storage system and the LUN may be stored on one or more PDs that are physically disconnected from the data storage system. In this manner, the lockbox cannot be accessed and, as long as the PD remains physically disconnected, there is no access to the lockbox stored on the LUN. Thus, storing the lockbox on the LUN that is physically disconnected provides a high level of security. However, the lockbox stored on the physically disconnected LUN and PD is also inaccessible to authorized user accesses. In this latter case, providing access to the lockbox additionally requires physically reconnecting the PD providing storage for the lockbox.

Described in following paragraphs are techniques that may be used to securely protect and store information on a LUN or logical device. The information may be sensitive or critical information, such as one or more passwords or keys used for encryption and/or decryption. The information stored on the LUN may be used in connection with various operations on the data storage system. For example, a key may be used in connection with encrypting and decrypting user data, a password may be used to access a system file, and the like. The LUN may be configured as a new type of logical device having an attribute that indicates the LUN is a stealth device or stealth LUN. The stealth device attribute may denote the use of the LUN as a lockbox for storing sensitive or critical information. The stealth device attribute may indicate that the LUN has its accessibility controlled by the data storage system. In at least one embodiment, the accessibility may be controlled by commands issued to the data storage system over the control path, such as over a management network. In at least one embodiment, such commands may be issued to the data storage system from a system console or computer system directly connected to the data storage system. In such embodiments, the command may be issued to the data storage system where the command changes the accessibility mode of the stealth LUN as desired. However, in such embodiments, the data storage system may not accept commands to change the accessibility mode of the stealth LUN from other sources not included in the management network or control path. For example, commands to change the accessibility mode of the stealth LUN may be disallowed from hosts or other external clients not included in the control path or management network.

The accessibility mode of the stealth LUN may be modified as desired to make the stealth LUN accessible or inaccessible to one or more hosts. In at least one embodiment, the stealth LUN may be accessible to one or more hosts for very brief, short periods of time to read and/or write data to the stealth LUN. Otherwise, the stealth LUN may be inaccessible to the one or more hosts. In this manner, the amount of time during which the stealth LUN may be subject to any unauthorized user access, such as from a remote host, is limited or restricted. Furthermore, since the accessibility to the stealth LUN is controlled by the data storage system and requests to modify the stealth LUN accessibility are not allowed from the host or data path, access control to the stealth LUN may not be modified by an unauthorized user of the host (e.g., where the unauthorized host access is due to host vulnerabilities).

One or more control mechanisms may be used to control accessibility to the stealth LUN by a host. Such control mechanisms may include, for example, one or more of masking information, zoning information and reservation information. It should be noted that masking information, zoning information and rezoning or reconfiguration of the switching fabric, and reservation information are all described in more detail in following paragraphs.

In at least one embodiment, access to the stealth LUN by the host may be controlled by modifying masking information but not zoning information used by a switch or switching fabric between the host and data storage system. In such an embodiment, the switching fabric is not rezoned or reconfigured using updated zoning information responsive to a request to change accessibility to the stealth LUN. However, in such an embodiment, the masking information is modified responsive to a request to change accessibility to the stealth LUN.

In at least one embodiment, access to the stealth LUN by the host may be controlled by modifying zoning information used by a switch or switching fabric between the host and data storage system but without modifying masking information. In such an embodiment, the switching fabric is reconfigured or rezoned using updated zoning information responsive to a request to change accessibility to the stealth LUN. However, in such an embodiment, the masking information is not modified responsive to a request to change accessibility to the stealth LUN.

In at least one embodiment, access to the stealth LUN by the host may be controlled by modifying both masking information and also zoning information used by a switch or switching fabric between the host and data storage system. In such an embodiment, the switching fabric is rezoned or reconfigured using updated zoning information responsive to a request to change accessibility to the stealth LUN. Additionally, in such an embodiment, the masking information is also modified responsive to a request to change accessibility to the stealth LUN.

In at least one embodiment, access to the stealth LUN by the host may be controlled using reservation information for the stealth LUN. To make the stealth LUN inaccessible to all hosts, the data storage system may exclusively reserve the stealth LUN. The exclusive reservation by the data storage system may also not be pre-empted by another reservation from an external client, such as a host.

The foregoing and other aspects of the techniques herein are described in more detail in following paragraphs and figures.

Masking may be generally characterized as a process performed on the data storage system that indicates which of the LUNs are exposed over which target ports to which initiators. For example with reference back to FIG. 3, the target port B1 may be configured to have 100 LUNs attached or mapped to it where the 100 attached LUNs may be potentially exposed to any initiator. The masking information (also sometimes referred to as mask information or LUN mask information) provides the HAs and their target ports information identifying which of the 100 LUNs are exposed over which of the target ports to which host initiators. For example, with reference to FIG. 3, assume there are 100 LUNs attached or mapped internally in the data storage system to target port B1. In this example, masking information may indicate that only 3 of the 100 LUNs—specifically LUNs 5, 6 and 10—are exposed to each of the initiators A1, A2 and A3 over each of the target ports B1, B2 and B3.

Thus, masking information for the stealth LUN may be modified as desired to control or limit access to the stealth LUN. The masking information for the stealth LUN may be modified, for example, to add or remove one or more target ports over which the stealth LUN is exposed. The masking information for the stealth LUN may be modified, for example, to add or remove one or more initiator ports over which the stealth LUN is exposed.

In a SAN, zoning is allows for selectively allowing access to data only to certain data storage system clients. Essentially, zoning allows an administrator to control which initiator(s)) can see what target ports in a SAN. Zoning may be used alone, or in combination with LUN masking, to provide control over who (e.g., what initiator(s)) can see what data/devices (e.g., LUNs) over which target ports in a SAN. Zones may be created by grouping world wide port names (WWPNs) of host interfaces (e.g., initiators) and data storage system interfaces (e.g., target ports) into zones. The set of zones created may be placed into a zone set which is then activated on the fabric, such as the switching fabric to define the logical connections between host initiators and target ports of the data storage system. Zoning may be performed by issuing requests or commands to the switch. For example, with reference back to FIG. 3, a host initiator may be host port A3 which is zoned to target ports B1, B2 and B3 of the data storage system. Similarly, host initiator ports A1 and A2 may each be zoned to target ports B1, B2 and B3 of the data storage system. Once such zones are created and activated, the various affected ports may be notified by the switching fabric and can perform processing to discover the zoning changes and log into the switch to establish any new connections.

Thus, zoning may be generally characterized as defining logical connections between the various host initiators and target ports. Existing connectivity including a set of logical connections between the host initiators and target ports may be modified by accordingly modifying existing zoning information currently activated or in use by the switching fabric. Such modification may include any of creating a new zone, modifying and/or replacing zoning information of an existing zone, deleting an existing zone, and the like. A zoning modification may be made by issuing appropriate requests to the switching fabric. For example, referring again to FIG. 3, assume for illustration purposes that initiator port A3 is only zoned to target port B3 whereby LUNs 5, 6 and 10 are exposed to A3 only over target port B3 (and not exposed through target ports B1 and B2). Also assume that initiator port A2 is similarly zoned only to target port B3 whereby LUNs 5, 6 and 10 are exposed to A2 only over target port B3 (and not exposed through target ports B1 and B2). Assume further that A1 is not included in any zone and therefore has no connectivity to the data storage system 120 and currently target ports B1 and B2 are not zoned. Thus, all I/Os and other commands directed to LUNs 5, 6 and 10 from A2 and A3 flow only through target port B3.

In a similar manner, zoning changes may be made to modify accessibility to a stealth LUN. For example, zoning changes may be made to disallow any/all access to a stealth LUN from any host (e.g., any initiator of any host), or alternatively only allow access to a stealth LUN from a particular host, from a particular initiator of the host, through only particular target ports, and the like.

In an embodiment, the masking information may be modified by the data storage system to control or change the accessibility to the stealth LUN as desired. In a similar manner, if zoning changes are made to control or change accessibility to the stealth LUN, the data storage system may communicate with the SAN fabric services to implement any required zoning changes and thus modify existing switch connectivity information.

In an embodiment in accordance with the techniques herein, a LUN designated as a stealth LUN may be initially discovered by the host, mounted by the operating system or file system of the host, and then further accessed by the host such as to read data from, and/or write data to, the LUN. Subsequently, at later points in time, the stealth LUN may be made accessible or inaccessible to the host responsive to commands executed on the data storage system. The commands may be issued to the data storage system over a control path. For example, the commands controlling the accessibility of the stealth LUN may be issued from a management console or computer system directly connected to the data storage system. The commands controlling the accessibility of the stealth LUN may be issued from a component, such as a computer system, included in a management network of the control path.

Referring to FIG. 5A, shown is an example of components that may be used in an embodiment in accordance with the techniques herein. The example 200 includes the host 102, switch 140 and data storage system 120 as generally described above in connection with FIG. 3 but with differences described in more detail below.

In this example 200 the data storage system includes the stealth LUN 212. The stealth LUN 212 may be a LUN having storage provisioned on PDs of the data storage system 120. The stealth LUN 212 may also be configured as a new type of logical device having an attribute that indicates the LUN is a stealth device or stealth LUN as described herein. The stealth LUN 212, as denoted by the stealth device attribute, may denote the use of the LUN 212 as a lockbox 214 for storing sensitive or critical information, such as passwords or keys used for encryption and/or decryption. The stealth device attribute may indicate that the LUN 212 has its accessibility controlled by the data storage system 120 based only on commands issued over the control path, such as over the management network 220. For example, the commands may be issued from a management console or server that is a computer system in communication with the data storage system. In such an embodiment, a command may be issued by a user or through an automated process on the management console or server 210 using the management software 210a. The command may be a request to change the accessibility mode of the stealth LUN 212 as desired. In response, the management console or server 210 may send the command to the data storage system 120 where the data storage system 120 performs processing to execute the command making the desired accessibility change or modification.

The stealth LUN 212 may have an associated mode indicating whether the stealth LUN 212 is currently accessible or inaccessible such as to the host 102. For example, the command issued from the management server 210 to the data storage system 120 may be a request to change the mode of the stealth LUN to accessible or inaccessible. Responsive to receiving the command to modify the accessibility of the stealth LUN 212, the data storage system may perform processing to execute the command using one or more control mechanisms described in more detail below.

In the FIG. 5A, the switch 140 is zoned to expose the stealth LUN 212 over target port B1 to the host initiator port A1. Additionally, the data storage system 120 includes masking information 230. Generally, the masking information 230 may identify what one or more LUNs 234 are accessible over which paths or connections 232. The masking information 230 may include a row of information for each path or connection 232 and may identify the one or more LUNs 234 accessible over that path or connection. In this example 200, the masking information 230 indicates that the stealth LUN 212 is accessible over connection A1-B1, where A1 is an initiator port and B1 is a target port of the data storage system 120. In such an embodiment, both the zoning information used to configure the switch 140 and the masking information 230 collectively define the connectivity or accessibility of the stealth LUN 212 by the host 102.

The example 200 may denote the state of the configuration of the components at a first point in time when the stealth LUN 212 is accessible to the host 102 over path or connection A1-B1. At this first point in time, the host 102 may issue I/Os directed to the stealth LUN 212. For example, the host 102 may issue writes over path A1-B1 to initially store on the stealth LUN 212 passwords and keys used for encryption or decryption.

In an embodiment in which the I/O is issued over the path A1-B1 to the stealth LUN 212, the data storage system uses the masking information 230 to determine whether the stealth LUN 212 is accessible for use in servicing the I/O. If the masking information 230 indicates that the stealth LUN is accessible over the path over which the I/O is received, then the I/O is serviced. Otherwise, the I/O is not serviced and results in an error returned to the initiator of the I/O. In this manner, the combination of the zoning of the switch 140 and the masking information 230 may determine the accessibility of the stealth LUN. For the stealth LUN to be accessible over the path A1-B, the switch must be zoned or configured to define the logical connection or path A1-B1 over which the stealth LUN 212 is exposed or visible, and additionally, the masking information 230 may indicate that the stealth LUN 212 is accessible over the path A1-B1. If the switch is not zoned to define the path A1-B1, or the masking information 230 indicates the stealth LUN 212 is inaccessible over the path A1-B1, then the LUN 212 is not accessible for I/Os over the path A1-B1.

At a second point in time subsequent to storing the passwords and keys on the stealth LUN 212, a first command may be issued from the management console or server 210 to the data storage system to make the stealth LUN 212 inaccessible. In response to receiving the first command, the data storage system may perform processing to execute or implement the command using one or more control mechanisms controlling access to the stealth LUN 212.

An embodiment in accordance with the techniques herein may use masking information to control and modify the accessibility to the stealth LUN 212. Thus, the processing performed by the data storage system responsive to the first command so that the stealth LUN 212 is inaccessible may include accordingly modifying the masking information 230 as will now be described with reference to FIG. 5B.

Figure 5B:
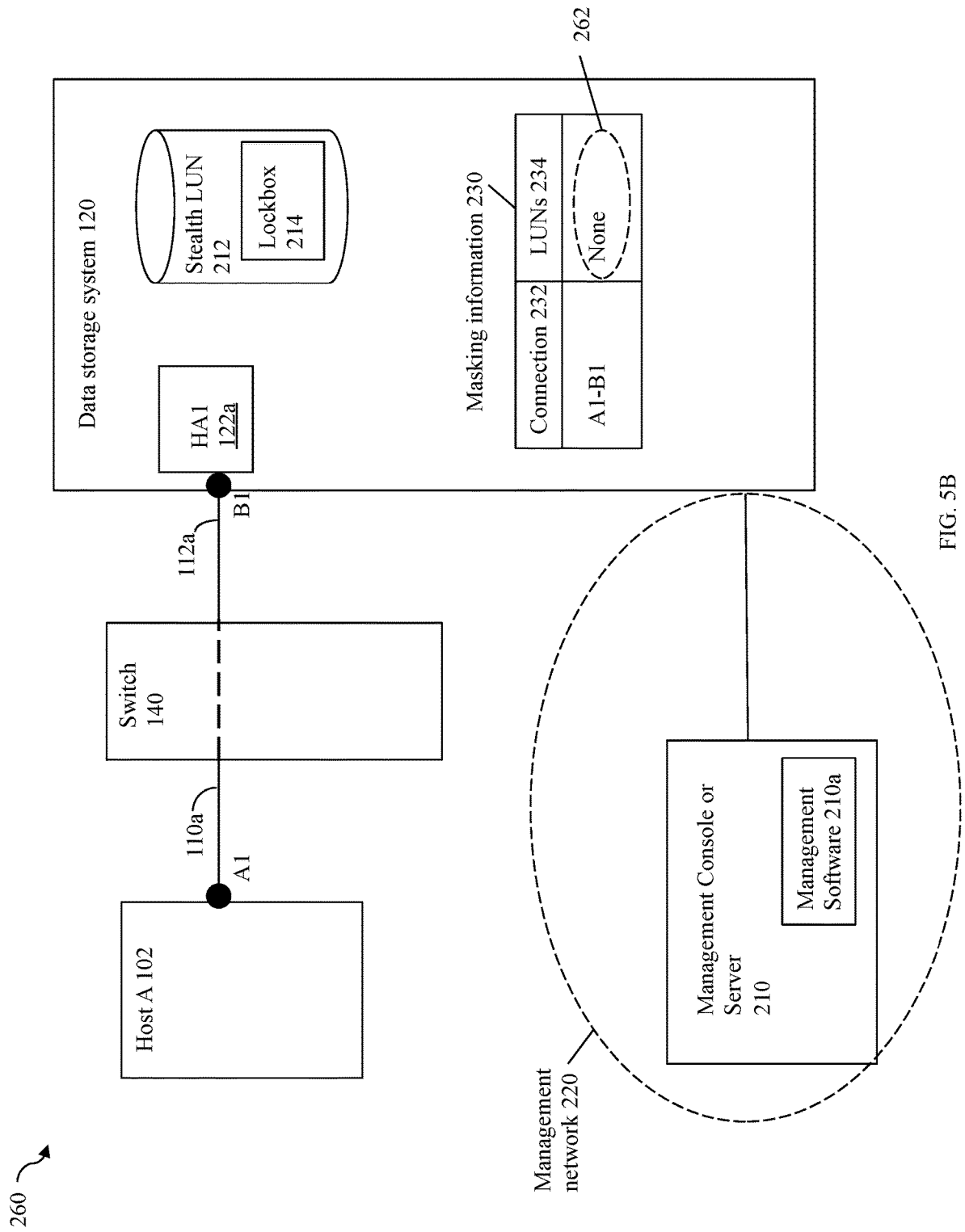

Referring to FIG. 5B, shown is an example illustrating use of the techniques herein in which masking information may be modified to control access to the stealth LUN 212. The example 260 includes components similar to that as described in connection with FIG. 5A with the difference that masking information 230 has been modified.

In the example 260, the data storage system 120 performs processing responsive to the first command issued from the management console or server 210 to make the stealth LUN 212 inaccessible. In this example, the processing performed may make the stealth LUN 212 inaccessible over all paths.

The processing includes modifying the masking information 230 to indicate that the stealth LUN 212 is not accessible over the connection A1-B1. In particular, element 235 of the FIG. 5A has been updated to element 262 in the FIG. 5B. Element 262 indicates that the stealth LUN 212 has been removed from the masking information and the stealth LUN 212 is no longer accessible over path or connection A1-B1. In at least one embodiment, if the masking information 230 included other paths or connections 232 over which the stealth LUN 212 was accessible, the masking information 230 may also be modified to unmask the LUN 212 from such other paths or connections 232.

In the example 260, the zoning information has not been modified and thus the switch 140 has not been rezoned. The switch 140 remains zoned to provide connectivity between A1 and B1. However, any I/O issued to the stealth LUN 212 over the path A1-B1 is rejected, not serviced and results in an error due to the masking information 230 not also indicating that the stealth LUN 212 is accessible over the path A1-B1.

In at least one embodiment as illustrated in FIG. 5B, access to the stealth LUN 212 may be controlled by modifying the masking information 230 without modifying the zoning information and thus without rezoning the switch 140.

Figure 5C:
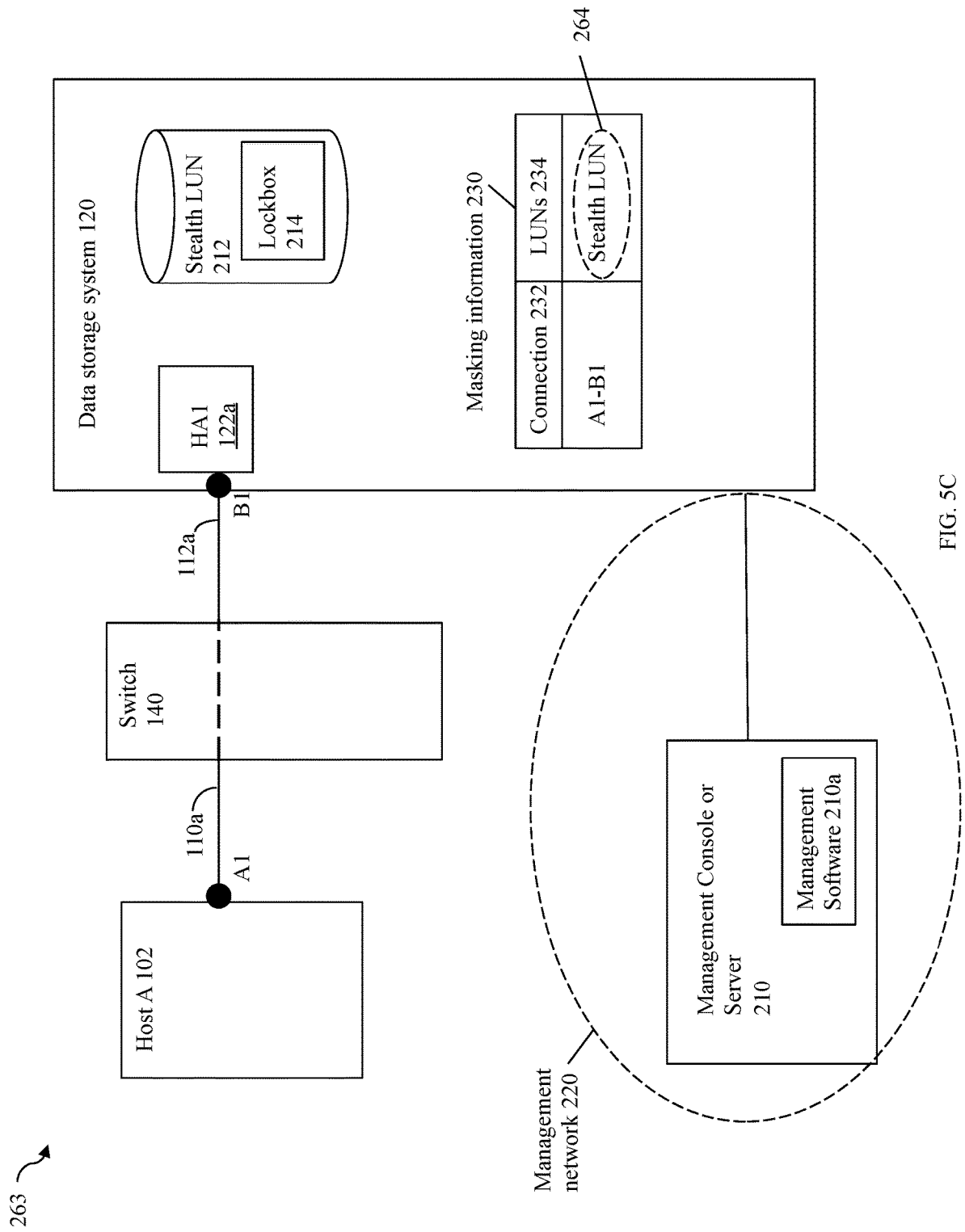

At a third point in time subsequent to the second point in time, a second command may be issued from the management console or server 210 to the data storage system 120 to make the stealth LUN 212 once again accessible. In response, the data storage system may perform processing to execute or implement the command using one or more control mechanisms controlling access to the stealth LUN 212. In the embodiment described in connection with FIG. 5B, responsive to the second command, the masking information 230 may be modified to indicate that stealth LUN 212 is accessible over the path A1-B1. In particular, element 262 of the masking information 230 of FIG. 5B may be updated as denoted by element 264 of FIG. 5C to once again list the stealth LUN 212 as accessible over the path A1-B1.

As a variation to that described above in connection with FIGS. 5B and 5C, an embodiment in accordance with the techniques herein may control access to the stealth LUN 212 by modifying the zoning information and thus rezoning the switch 140, and also by modifying the masking information. Thus, as described in more detail in connection with FIGS. 6A and 6B, both the zoning information and the masking information may be modified responsive to a command to modify the accessibility of the stealth LUN 212.

Figure 6A:
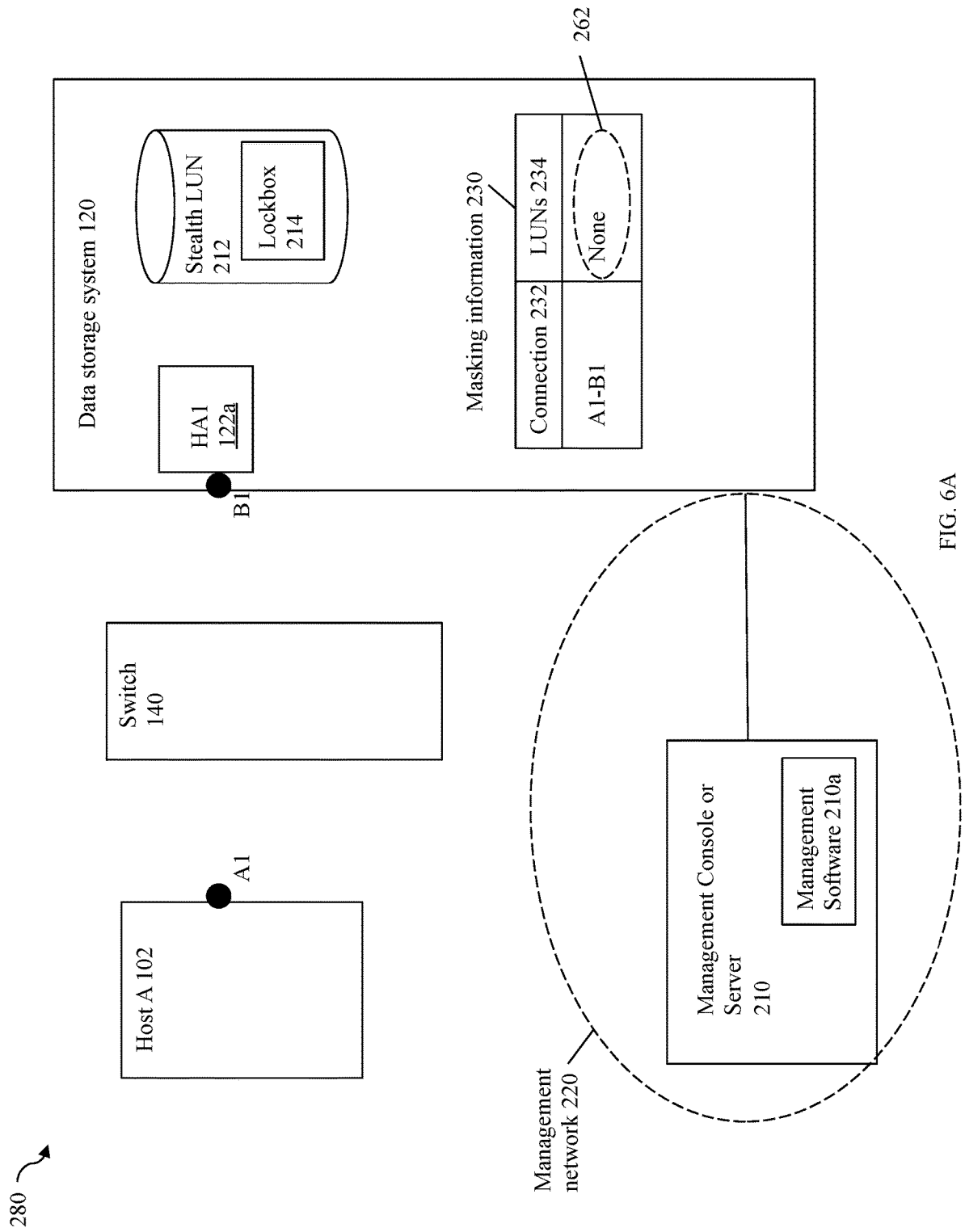
Figure 6B:
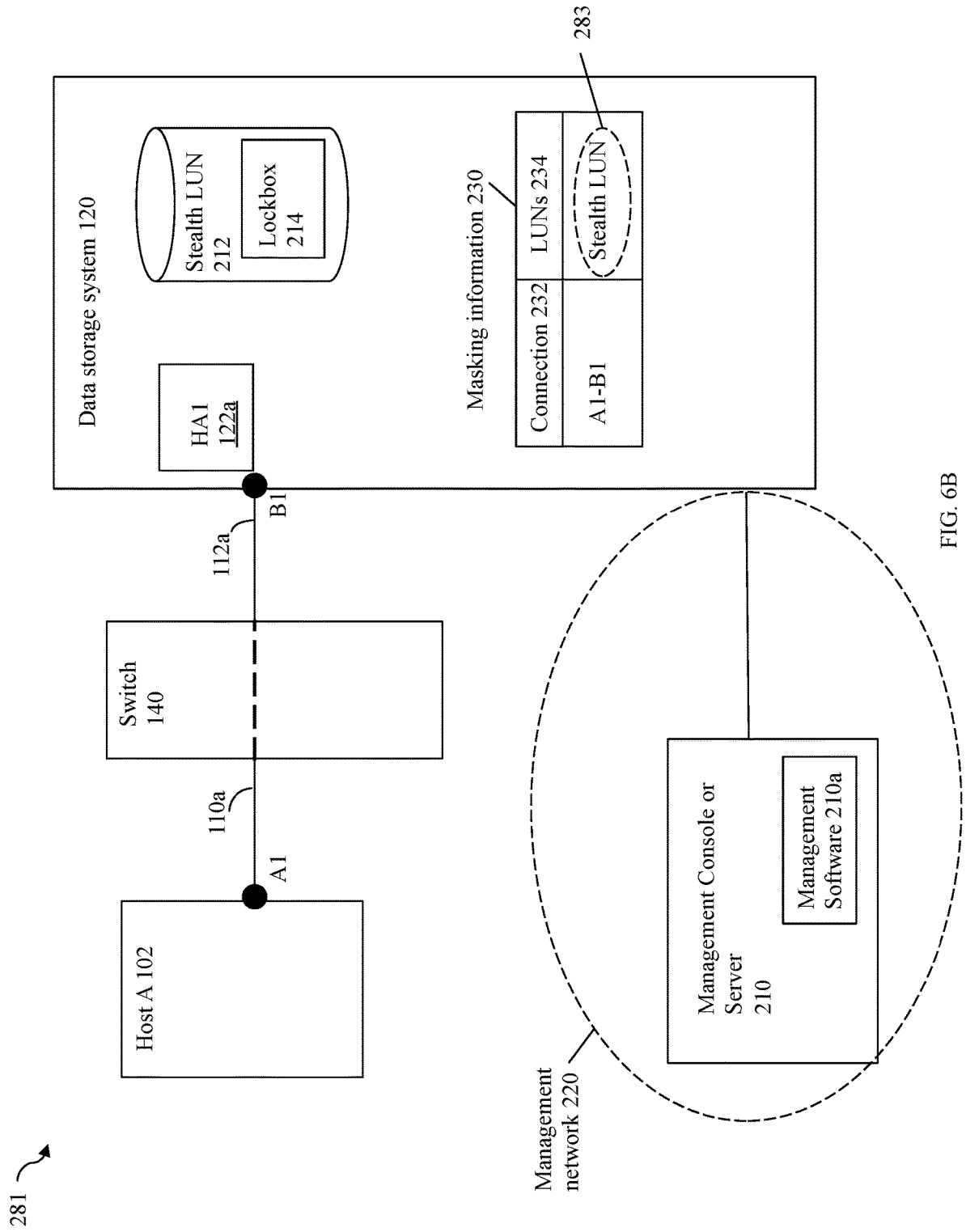

Referring to FIG. 6A, shown is an example illustrating use of the techniques herein in which the masking information and also the zoning information may be modified to control access to the stealth LUN 212. The example 280 includes components similar to that as described in connection with FIG. 5B with the difference that the switch 140 has also been rezoned to match the accessibility indicated by the masking information 230.

In the example 280, the data storage system 120 performs processing responsive to the first command issued from the management console or server 210 to make the stealth LUN 212 inaccessible. In this example, the processing performed may make the stealth LUN 212 inaccessible over all paths. As discussed above in connection with FIG. 5B, the processing includes modifying the masking information 230 as denoted by 262 to indicate that the stealth LUN 212 is not accessible over the connection A1-B1. In particular, element 235 of the FIG. 5A has been updated to element 262 in the FIG. 5C. Element 262 indicates that the stealth LUN 212 has been removed from the masking information and the stealth LUN 212 is no longer accessible over path or connection A1-B1.

Additionally, in the example 280, the zoning information used to configure the switch 140 has also been modified and the switch 140 rezoned using the modified zoning information. The switch 140 in the example 280 is rezoned to remove the connectivity or path between A1 and B1. The removal of the path or connectivity between A1 and B1 is denoted in the FIG. 6A by the removal of the connections 110a and 112a to the switch 140 as previously illustrated in the FIGS. 5A, 5B and 5C.

In at least one embodiment as illustrated in the FIG. 6A, access to the stealth LUN 212 may be controlled by modifying the masking information 230 and also by modifying the zoning information and thus rezoning the switch 140. In such an embodiment as in FIG. 6A, the switch 140 may be rezoned to denote the same accessibility as the masking information 230 with respect to the stealth LUN 212 as requested by the first command from the management console or server 210.

With reference to the embodiment of FIG. 6A, at the third point in time subsequent to the second point in time, the second command may be issued from the management console or server 210 to the data storage system 120 to make the stealth LUN 212 once again accessible. In response, the data storage system may perform processing to execute or implement the command using one or more control mechanisms controlling access to the stealth LUN 212. In the embodiment described in connection with FIG. 6A, responsive to the second command, the masking information 230 may be modified as denoted by element 283 of the FIG. 6B to indicate that stealth LUN 212 is now accessible over the path A1-B1. In particular, element 262 of the masking information 230 of FIG. 6A may be updated as denoted by element 283 of FIG. 6B to list stealth LUN 212 as accessible over the path A1-B1. Additionally, as also denoted in the FIG. 6B as compared to the FIG. 6A, the switch 140 may be rezoned to once again establish the path or connectivity between A1 and B1 through the switch 140. The re-establishment of the path between A1 and B1 through the switch 140 is denoted in FIG. 6B by reestablishing the connection 110 from A1 to the switch 140 and the connection 112a from B1 to the switch 140.

As yet another variation to that described above in connection with FIGS. 6A and 6B, an embodiment in accordance with the techniques herein may control access to the stealth LUN 212 by modifying the zoning information and thus rezoning the switch 140, but without also modifying the masking information. Thus, as described below in connection with the FIGS. 7A and 7B, only the zoning information, but not the masking information may be modified responsive to a command to modify the accessibility of the stealth LUN 212.

Figure 7A:
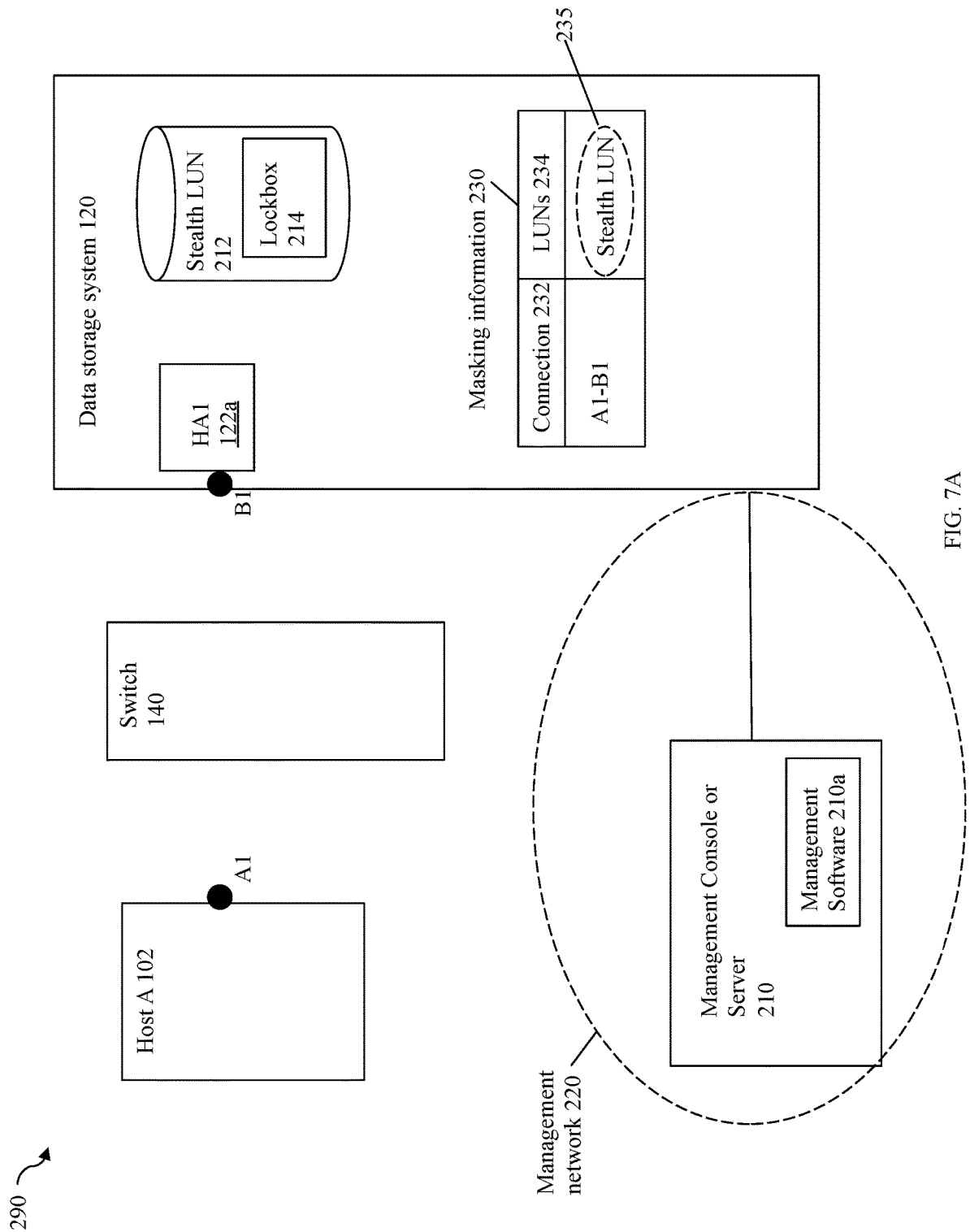
Figure 7B:
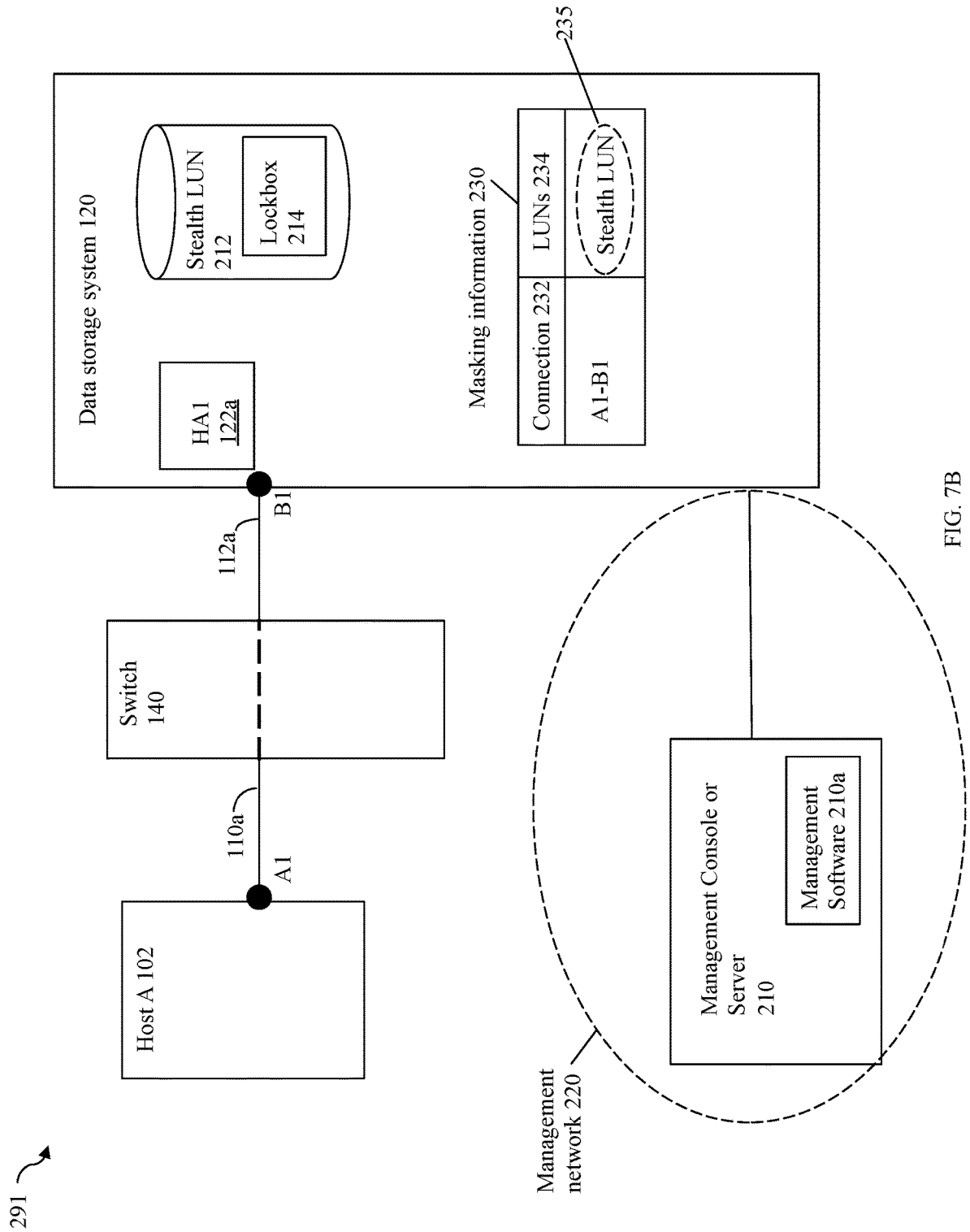

Referring to FIG. 7A, shown is an example illustrating use of the techniques herein in which the zoning information but not the masking information may be modified to control access to the stealth LUN 212. The example 290 includes components similar to that as described in connection with FIG. 6A with the difference that the switch 140 has been rezoned so that the stealth LUN 212 is inaccessible over the path A1-B1 but the masking information 230 has not been modified. In other words, the masking information 230 of the FIG. 7A is the same as in FIG. 5A but the switch 140 of the FIG. 7A has been rezoned as illustrated in FIG. 6A.

In the example 290, the data storage system 120 performs processing responsive to the first command issued from the management console or server 210 to make the stealth LUN 212 inaccessible. In this example, the processing performed may make the stealth LUN 212 inaccessible over all paths. The processing includes updating the zoning information used by the switch and rezoning the switch 140 to indicate that the stealth LUN 212 is not accessible over the connection A1-B1. The switch 140 in the example 290 is rezoned in a manner similar to that as described in connection with FIG. 6A to remove the connectivity or path between A1 and B1. However, the processing performed responsive to the first command does not include modifying the masking information 230.

In at least one embodiment as illustrated in the FIG. 7A, access to the stealth LUN 212 may be controlled by modifying the zoning information and thus rezoning the switch 140 but without modifying the masking information 230.

With reference to the embodiment of FIG. 7A, at the third point in time subsequent to the second point in time, the second command may be issued from the management console or server 210 to the data storage system 120 to make the stealth LUN 212 once again accessible. In response, the data storage system may perform processing to execute or implement the command using one or more control mechanisms controlling access to the stealth LUN 212. In the embodiment described in connection with FIG. 7A, responsive to the second command, the switch 140 may be rezoned to once again establish the path or connectivity between A1 and B1. In particular as illustrated in the FIG. 7B, the path or connectivity between A1 and B1 may be rezoned to re-establish the connections 110a (between A1 and the switch) and 112a (between B1 and the switch). In connection with the embodiment of the FIGS. 7A and 7B, responsive to the second command, the masking information 230 is once again not modified to control the accessibility of the stealth LUN 212.

The embodiments described above in connection with FIGS. 5A-5C, 6A-6B and 7A-7B provide for variations in controlling and modifying the accessibility of the stealth LUN 212 by modifying the masking information and/or zoning information used to configure the switch 140. Responsive to receiving a command to make the stealth LUN 212 inaccessible, the examples described above may provide for making the stealth LUN 212 inaccessible over all paths to all hosts. As a variation, an embodiment may provide for a finer granularity of accessibility control. For example, an embodiment may provide support where the commands issued from the management console or server 210 to the data storage system 120 to control access to the stealth LUN 212 may be made with respect to particular paths between initiators and targets. For example, the command may indicate which one or more paths between a host and the data storage system over which the stealth LUN is to be accessible or inaccessible. For example, if there are 2 paths to a host over which the stealth LUN 212 is accessible, the command may indicate to make the stealth LUN 212 inaccessible over both paths or just a particular one of the paths.

As a variation, the command may indicate which one or more initiators or hosts to which the stealth LUN is to be accessible or inaccessible. For example, assume there are 2 hosts both having access to the stealth LUN 212. The command may indicate to make the stealth LUN 212 inaccessible to both hosts over all paths, or the command may indicate to make the stealth LUN 212 inaccessible to one of the 2 hosts and accessible to the other remaining second host.

As yet another variation, the command may indicate which one or more target ports over which the stealth LUN is to be accessible or inaccessible. For example, the stealth LUN 212 may be accessible over 3 target ports of the data storage system. The command may indicate to make the stealth LUN inaccessible over all 3 target ports, or may otherwise indicate to make the stealth LUN 212 accessible over one of the target ports and inaccessible over the remaining 2 target ports.

In at least one embodiment, there may be multiple hosts connected to the data storage system 120 rather than just the single host 102 as illustrated herein for simplicity. In such a case, the techniques herein may be used to vary the accessibility of the stealth LUN 212 to different hosts over different paths.

In at least one embodiment using the techniques described above in which access to the stealth LUN 212 may be controlled by modifying the masking information 230 and/or rezoning the switch 140, the stealth LUN 212 may have its access modified from accessible to inaccessible. In particular, the host 102 may determine that the stealth LUN 212 has transitioned from a state of accessible to inaccessible. In at least one embodiment, when the stealth LUN 212 is made inaccessible to the host 102 over a path by unmasking and/or unzoning as in connection with the embodiments described above, the stealth LUN 212 may not be visible, exposed or presented to the host 102 over the path. In at least one embodiment, when the stealth LUN 212 is made accessible to the host 102 over a path by masking and/or zoning as in connection with the embodiments described above, the stealth LUN 212 may be visible, exposed or presented to the host 102 over the path.

Responsive to the stealth LUN 212 becoming inaccessible by unmasking and/or unzoning the stealth LUN 212 in such embodiments as described above where the stealth LUN 212 is not visible, exposed or presented to the host 102 over a path, the host 102 may determine that the stealth LUN 212 is not ready for use. Subsequently, the stealth LUN 212 may once again transition to accessible over the path where the stealth LUN 212 is again exposed or visible to the host 102 over the path. In connection with restoring access to the stealth LUN 212, the host 102 may perform processing that may be disruptive or otherwise consume an undesirable amount of host resources. For example, in order for the host 102 to once again access the stealth LUN 212 that has now become visible or exposed, such processing performed by the host in connection with restoring access to the stealth LUN 212 may include rebooting the host, performing device discovery or rescan to obtain information about the restored stealth LUN 212, remounting a file system on the LUN, and the like. Such processing may be disruptive to existing host operations, may consume additional host processing time and resources, and may also require user interaction. The particular host actions or operations required to allow the host to once again resume using the stealth LUN may vary with embodiment.

Accordingly, in cases where there may be undesirable adverse impact to the host using one of the embodiments described above causing the stealth LUN 212 to transition between being invisible or unexposed to the host and then visible or exposed to the host, described in following paragraphs is yet another embodiment in accordance with the techniques herein. In the embodiment described below, accessibility to the stealth LUN may be controlled using device reservations. In particular, an embodiment may use SCSI-based reservations to make the stealth LUN inaccessible to the host. In such an embodiment, the stealth LUN may remain visible, exposed or presented to the host even when the stealth LUN is inaccessible to the host. In such an embodiment, the stealth LUN does not transition between being exposed or presented when accessible and otherwise not exposed or not presented when inaccessible. In this manner the host does not have to perform the possibly disruptive or undesirable processing to use the stealth LUN that becomes visible or exposed to the host. In the embodiment using device reservations as the control mechanism, the stealth LUN may be made inaccessible through an exclusive reservation on the stealth LUN whereby I/Os to the stealth LUN are not allowed. As described below with reference to FIG. 8, the data storage system may place an exclusive reservation that cannot be pre-empted responsive to a command to make the stealth LUN 212 inaccessible to the host.

With reference to FIG. 5A, assume that the host 102 currently has access to the stealth LUN over path A1-B1 and the host has written information to the stealth LUN 212. What will now be described with reference to FIG. 8 is processing performed in connection with transitioning the stealth LUN 212 mode from accessible to inaccessible.

Figure 8:
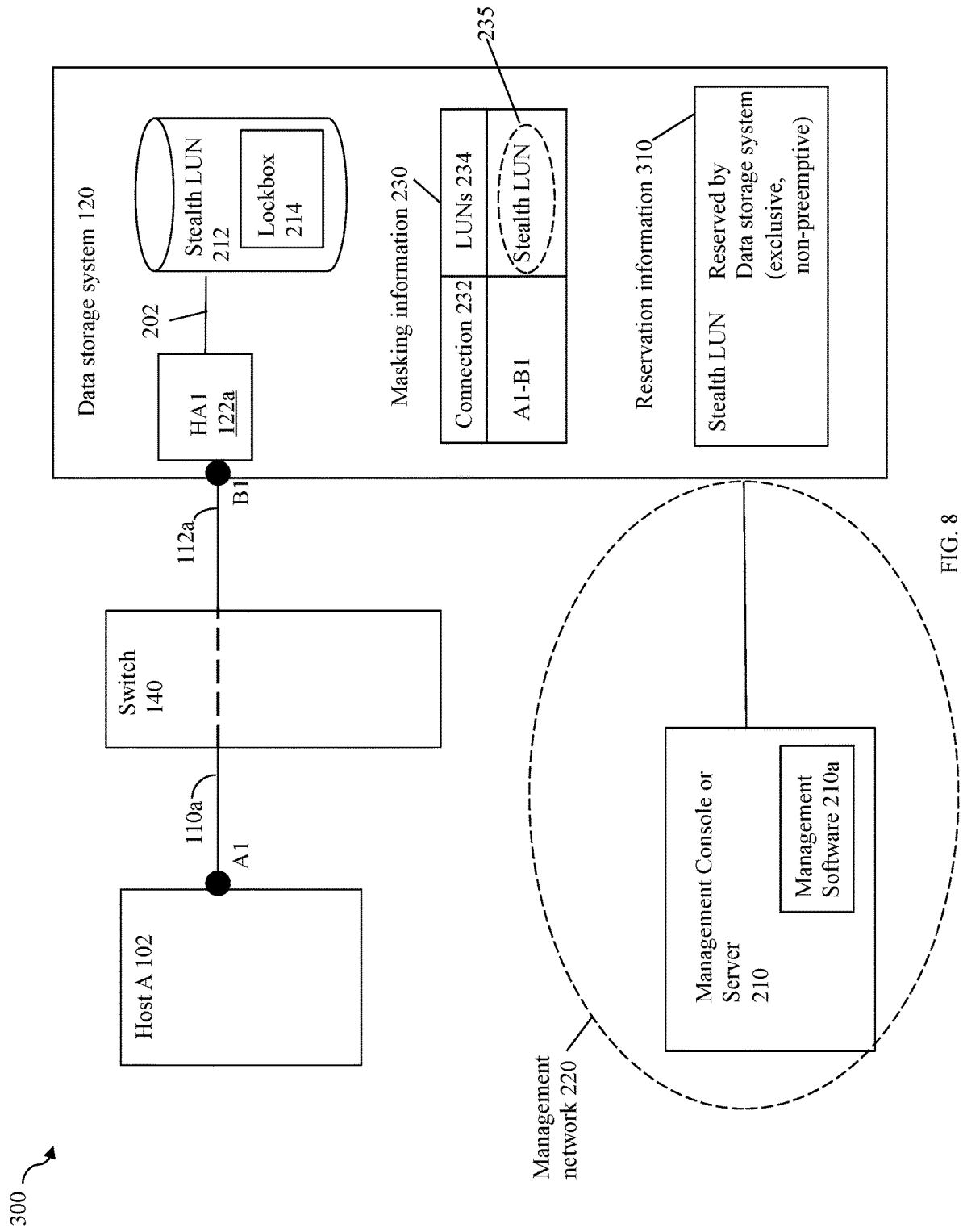

Referring to FIG. 8, shown is an example illustrating use of the techniques herein in which reservation information may be modified to control access to the stealth LUN 212. The example 300 includes components similar to that as described above in connection with FIG. 5A with the difference of additional reservation information 310 described below.

In the example 300, the data storage system 120 performs processing responsive to the first command issued from the management console or server 210 to make the stealth LUN 212 inaccessible. In this example, the processing performed may make the stealth LUN 212 inaccessible over all paths.

In at least one embodiment as illustrated in the FIG. 8, access to the stealth LUN 212 may be controlled using reservation information for the stealth LUN 212. In particular, responsive to receiving the first command to make the stealth LUN 212 inaccessible, the data storage system may place an exclusive reservation on the stealth LUN 212 denoting that no host or other client can access the stealth LUN 212. Any attempts by the host 102 to issue I/Os to the stealth LUN 212 over the path A1-B1 results in an error or reservation conflict whereby the I/Os are not serviced. Additionally, the exclusive reservation of the stealth LUN 212 by the data storage system is also not pre-emptive. In connection with the SCSI standard, a device reservation that can be pre-empted is one in which another initiator may request that an existing device reservation be remove or pre-empted. In an embodiment in accordance with the techniques herein, the exclusive reservation made by the data storage system is not pre-emptive so that another initiator is unable to remove the existing exclusive reservation of the stealth LUN made by the data storage system.

In such an embodiment as described in connection with FIG. 8, the data storage system may place the exclusive, non-preemptive reservation on the stealth LUN responsive to the first command to make the stealth LUN 212 inaccessible. In this manner, the reservation information 310 of the data storage system may be accordingly updated as illustrated in the FIG. 8.

In connection with the embodiment of FIG. 8, the stealth LUN 212 is visible, presented or exposed to the host 102 over the path A1-B1 even when the exclusive, non-preemptable reservation has been placed on the stealth LUN 212 by the data storage system. In such an embodiment, the stealth LUN 212 may remain visible or exposed over the path A1-B1 independent of whether the stealth LUN has an associated mode of accessible or inaccessible, and independent of whether there is a reservation on the stealth LUN 212. Inaccessibility to the stealth LUN 212 is enforced using the reservation on the stealth LUN 212 rather than by failing to expose or present the stealth LUN 212 over the path A1-B1.

With reference to the embodiment of FIG. 8, at the third point in time subsequent to the second point in time, the second command may be issued from the management console or server 210 to the data storage system 120 to make the stealth LUN 212 once again accessible. In response, the data storage system may perform processing to execute or implement the second command using one or more control mechanisms controlling access to the stealth LUN 212. In the embodiment described in connection with FIG. 8, responsive to the second command, the data storage system may perform processing to remove its existing exclusive non-preemptive reservation of the stealth LUN 212 from the reservation information 310.

Once the above-noted reservation has been removed, subsequent I/Os from the host 102 over the path A1-B1 directed to the stealth LUN 212 are serviced and no longer result in a reservation conflict.

Figure 9:
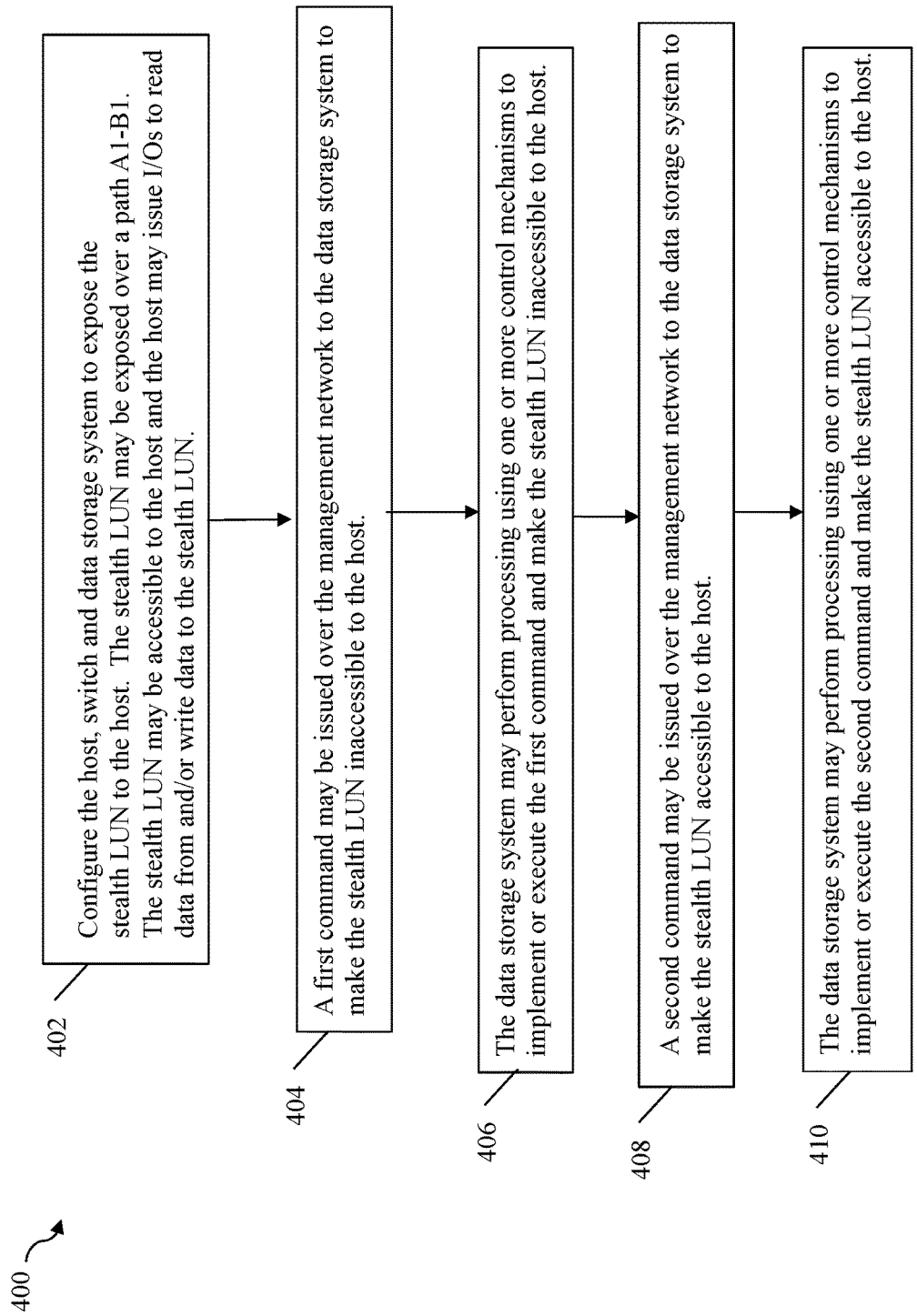
FIG. 9 is a flowchart of processing steps that may be performed in an embodiment in accordance with the techniques herein.

Referring to FIG. 9, shown is a flowchart 400 summarizing processing described above that may be performed in an embodiment in accordance with the techniques herein.

At the step 402, the host, switch and data storage system may be configured to expose the stealth LUN to the host. The stealth LUN may be exposed over a path A1-B1. The stealth LUN may be accessible to the host. The host may issue I/Os to read data from and/or write data to the stealth LUN. From the step 402, control proceeds to the step 404. At the step 404, a first command may be issued over the management network to the data storage system to make the stealth LUN inaccessible to the host. From the step 404, control proceeds to the step 406. At the step 406, the data storage system may perform processing using one or more control mechanisms to implement or execute the first command and make the stealth LUN inaccessible to the host. From the step 406, control proceeds to the step 408. At the step 408, a second command may be issued over the management network to the data storage system to make the stealth LUN accessible to the host. From the step 408, control proceeds to the step 410. At the step 410, the data storage system may perform processing using one or more control mechanism to implement or execute the second command and make the stealth LUN accessible to the host.

Generally, the stealth LUN may be made accessible and inaccessible as needed. In at least one embodiment, the stealth LUN may be accessible and inaccessible, such as to one or more hosts, at predetermined times in accordance with a schedule. In such an embodiment, processing may be performed to establish or define the schedule. The schedule may then be used by the management server or console to automate the sending of commands to the data storage system to accordingly make the stealth LUN accessible and inaccessible based on the schedule.

The information stored on the stealth LUN may be stored in any suitable form. Additionally, the techniques herein may be used in connection with any one or more other desired layers of security or access protections.

In at least one embodiment, the information or data stored on the stealth LUN may not be encrypted. For example, passwords may be stored on the stealth LUN in plain text.

As a variation, the information or data stored on the stealth LUN may be encrypted with a key or require a password to access the information. The key or password needed to access the information on the stealth LUN may be obtained using any suitable technique. For example, the key or password may be stored on another system, such as another host or data storage system. The key or password may be obtained from a third party or facility. In this manner, an unauthorized user would also need to know where and how to obtain the key or password to access the information on the stealth LUN.

In at least one embodiment, a first key or password needed to access the information on the stealth LUN may be further encrypted using a second key. In at least one embodiment, the encrypted first key or password (encrypted using the second key) may be stored on the stealth LUN along with the information, such as the sensitive metadata. The encrypted first key or password may be encrypted with the second key that is a private key of a host, other system or facility. The encrypted first key or password may be provided to the host, other system or facility that then uses its private key to decrypt the encrypted first key or password. The resulting decrypted first key or password may then be used to access the information, such as the sensitive metadata, stored on the stealth LUN.

The techniques herein may be performed using any suitable hardware and/or software. For example, the techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of protecting information comprising:
    exposing a logical device of a data storage system to a host, wherein the logical device has an attribute identifying the logical device as a stealth device having accessibility controlled by the data storage system based on commands issued over a control path, wherein the logical device has a mode indicating whether the logical device is accessible to the host;
    sending, from the host to the data storage system, a write command that writes first data on the logical device when the mode indicates the logical device is accessible to the host;
    subsequent to said sending, issuing a command over the control path to the data storage system, wherein the command sets the mode of the logical device to inaccessible indicating the logical device is not accessible to the host; and
    responsive to the data storage system receiving the command that sets the mode of the logical device to inaccessible, performing first processing by the data storage system to execute the command using one or more control mechanisms that makes the logical device inaccessible to the host, wherein the one or more control mechanisms include reservation information for the logical device, and wherein the first processing performed by the data storage system includes:
    creating a reservation for the data storage system for the logical device, wherein the reservation for the data storage system provides exclusive access to the logical device by the data storage system, wherein when the host sends the write command that writes the first data on the logical device in connection with said sending, the data storage system does not have a reservation on the logical device and the mode indicates the logical device is accessible to the host.

2. The method of claim 1, wherein the first data includes a password used in connection with performing an operation on the data storage system.

3. The method of claim 1, wherein the first data includes a key used in connection with at least one of encryption and decryption of data stored on the data storage system.

4. The method of claim 1, wherein the reservation is marked as non-preemptive by another reservation request from an external client of the data storage system, and wherein the reservation information for the logical device is updated to denote the reservation by the data storage system.

5. The method of claim 4, wherein both prior to the first processing and also subsequent to the first processing, the logical device is exposed to an initiator port of the host through a target port of the data storage system.

6. The method of claim 5, further comprising:
    subsequent to said first processing, sending an I/O command from the host to the data storage system, wherein the I/O command is directed to the logical device;
    determining, by the data storage system using said reservation information for the logical device, that the host is not allowed to access the logical device; and
    responsive to determining, using the reservation information for the logical device, that the host is not allowed to access the logical device, not servicing the I/O command from the host.

7. The method of claim 1, wherein the first data stored on the logical device is protected using a password whereby the first data is only accessible upon providing the password.

8. The method of claim 1, wherein the first data stored on the logical device is encrypted.

9. The method of claim 1, wherein the mode of the logical device changes over time between a setting of accessible to the host and a setting of inaccessible to the host in accordance with a defined schedule.

10. The method of claim 1, wherein the attribute, identifying the logical device as a stealth device having accessibility controlled by the data storage system based on commands issued over the control path, is specified when configuring the logical device.

11. A method of protecting information comprising:
    exposing a logical device of a data storage system to a host, wherein the logical device has an attribute identifying the logical device as a stealth device having accessibility controlled by the data storage system based on commands issued over a control path, wherein the logical device has a mode indicating whether the logical device is accessible to the host;
    sending, from the host to the data storage system, a write command that writes first data on the logical device when the mode indicates the logical device is accessible to the host; and
    subsequent to said sending, issuing a command over the control path to the data storage system, wherein the command sets the mode of the logical device to inaccessible indicating the logical device is not accessible to the host, wherein responsive to the data storage system receiving the command, performing first processing by the data storage system to execute the command using one or more control mechanisms that makes the logical device inaccessible to the host, wherein the one or more control mechanisms include masking information and wherein the first processing includes modifying masking information to denote that the logical device is inaccessible to the host, wherein the logical device is exposed to the host over a target port of the data storage system; prior to the first processing, the masking information indicates that the logical device is accessible over a first path between an initiator port of the host and the target port of the data storage system and wherein, prior to the first processing, the logical device is exposed to the initiator port of the host through the target port of the data storage system; and after performing the first processing, the masking information indicates that the logical device is not accessible over the first path between the initiator port of the host and the target port of the data storage system and wherein, after the first processing, the logical device is not exposed to the initiator port of the host through the target port of the data storage system.

12. The method of claim 11, wherein the one or more control mechanisms include zoning information, wherein a switching fabric connects the host to the data storage system, and wherein the first processing includes modifying the zoning information used by the switching fabric to disallow access of the logical device to the host.

13. The method of claim 12, wherein prior to the data storage system performing first processing to execute the command, the zoning information indicates that the logical device is accessible, through the switching fabric, to a first initiator port of the host from a first target port of the data storage system.

14. The method of claim 13, wherein the first processing includes:
modifying the zoning information to indicate that the logical device is not accessible, through the switching fabric, to the first initiator port of the host from the first target port of the data storage system; and
reconfiguring the switching fabric using the zoning information that has been modified by said modifying to disallow access of the logical device to the first initiator port of the host from the first target port of the data storage system.

15. A system comprising:
one or more processors; and
a memory comprising code stored thereon that, when executed, performs a method of protecting information comprising:
exposing a logical device of a data storage system to a host, wherein the logical device has an attribute identifying the logical device as a stealth device having accessibility controlled by the data storage system based on commands issued over a control path, wherein the logical device has a mode indicating whether the logical device is accessible to the host;
sending, from the host to the data storage system, a write command that writes first data on the logical device when the mode indicates the logical device is accessible to the host;
subsequent to said sending, issuing a command over the control path to the data storage system, wherein the command sets the mode of the logical device to inaccessible indicating the logical device is not accessible to the host; and
responsive to the data storage system receiving the command that sets the mode of the logical device to inaccessible, performing first processing by the data storage system to execute the command using one or more control mechanisms that makes the logical device inaccessible to the host, wherein the one or more control mechanisms include reservation information for the logical device, and wherein the first processing performed by the data storage system includes:
creating a reservation for the data storage system for the logical device, wherein the reservation for the data storage system provides exclusive access to the logical device by the data storage system, wherein when the host sends the write command that writes the first data on the logical device in connection with said sending, the data storage system does not have a reservation on the logical device and the mode indicates the logical device is accessible to the host.

16. A non-transitory computer readable medium comprising code stored thereon that, when executed, performs a method of protecting information comprising:
exposing a logical device of a data storage system to a host, wherein the logical device has an attribute identifying the logical device as a stealth device having accessibility controlled by the data storage system based on commands issued over a control path, wherein the logical device has a mode indicating whether the logical device is accessible to the host;
sending, from the host to the data storage system, a write command that writes first data on the logical device when the mode indicates the logical device is accessible to the host;
subsequent to said sending, issuing a command over the control path to the data storage system, wherein the command sets the mode of the logical device to inaccessible indicating the logical device is not accessible to the host; and
responsive to the data storage system receiving the command that sets the mode of the logical device to inaccessible, performing first processing by the data storage system to execute the command using one or more control mechanisms that makes the logical device inaccessible to the host, wherein the one or more control mechanisms include reservation information for the logical device, and wherein the first processing performed by the data storage system includes:
creating a reservation for the data storage system for the logical device, wherein the reservation for the data storage system provides exclusive access to the logical device by the data storage system, wherein when the host sends the write command that writes the first data on the logical device in connection with said sending, the data storage system does not have a reservation on the logical device and the mode indicates the logical device is accessible to the host.

17. The non-transitory computer readable medium of claim 16, wherein the first data includes a password used in connection with performing an operation on the data storage system.

18. The non-transitory computer readable medium of claim 16, wherein the first data includes a key used in connection with at least one of encryption and decryption of data stored on the data storage system.

19. A system comprising:
one or more processors; and
a memory comprising codes stored thereon that, when executed, performs a method of protecting information comprising:

exposing a logical device of a data storage system to a host, wherein the logical device has an attribute identifying the logical device as a stealth device having accessibility controlled by the data storage system based on commands issued over a control path, wherein the logical device has a mode indicating whether the logical device is accessible to the host;

sending, from the host to the data storage system, a write command that writes first data on the logical device when the mode indicates the logical device is accessible to the host; and subsequent to said sending, issuing a command over the control path to the data storage system, wherein the command sets the mode of the logical device to inaccessible indicating the logical device is not accessible to the host, wherein responsive to the data storage system receiving the command, performing first processing by the data storage system to execute the command using one or more control mechanisms that makes the logical device inaccessible to the host, wherein the one or more control mechanisms include masking information and wherein the first processing includes modifying masking information to denote that the logical device is inaccessible to the host, wherein the logical device is exposed to the host over a target port of the data storage system; prior to the first processing, the masking information indicates that the logical device is accessible over a first path between an initiator port of the host and the target port of the data storage system and wherein, prior to the first processing, the logical device is exposed to the initiator port of the host through the target port of the data storage system; and after performing the first processing, the masking information indicates that the logical device is not accessible over the first path between the initiator port of the host and the target port of the data storage system and wherein, after the first processing, the logical device is not exposed to the initiator port of the host through the target port of the data storage system.

20. A non-transitory computer readable memory comprising code stored thereon that, when executed, performs a method of protecting information comprising:

exposing a logical device of a data storage system to a host, wherein the logical device has an attribute identifying the logical device as a stealth device having accessibility controlled by the data storage system based on commands issued over a control path, wherein the logical device has a mode indicating whether the logical device is accessible to the host;

sending, from the host to the data storage system, a write command that writes first data on the logical device when the mode indicates the logical device is accessible to the host; and subsequent to said sending, issuing a command over the control path to the data storage system, wherein the command sets the mode of the logical device to inaccessible indicating the logical device is not accessible to the host, wherein responsive to the data storage system receiving the command, performing first processing by the data storage system to execute the command using one or more control mechanisms that makes the logical device inaccessible to the host, wherein the one or more control mechanisms include masking information and wherein the first processing includes modifying masking information to denote that the logical device is inaccessible to the host, wherein the logical device is exposed to the host over a target port of the data storage system; prior to the first processing, the masking information indicates that the logical device is accessible over a first path between an initiator port of the host and the target port of the data storage system and wherein, prior to the first processing, the logical device is exposed to the initiator port of the host through the target port of the data storage system; and after performing the first processing, the masking information indicates that the logical device is not accessible over the first path between the initiator port of the host and the target port of the data storage system and wherein, after the first processing, the logical device is not exposed to the initiator port of the host through the target port of the data storage system.

* * * * *